United States Patent
Baumann

Patent Number: 5,251,063
Date of Patent: Oct. 5, 1993

[54] LARGE-APERTURE THREE-LENS OBJECTIVE WITH ASPHERICAL-SURFACES

[75] Inventor: Rainer Baumann, Überlingen/Bodensee, Fed. Rep. of Germany

[73] Assignee: Bodenseewerk Geratetechnik GmbH, Bodensee, Fed. Rep. of Germany

[21] Appl. No.: 961,815

[22] Filed: Oct. 16, 1992

[30] Foreign Application Priority Data

Oct. 16, 1991 [DE] Fed. Rep. of Germany ....... 4134227

[51] Int. Cl.⁵ .................. G02B 9/14; G02B 13/14; G02B 13/18
[52] U.S. Cl. .................. 359/355; 359/356; 359/709; 359/716; 359/785
[58] Field of Search .............. 359/355, 356, 357, 708, 359/709, 716, 785

[56] References Cited

U.S. PATENT DOCUMENTS

| | | | |
|---|---|---|---|
| 3,160,700 | 12/1964 | Snyder | 359/356 |
| 3,778,133 | 12/1973 | Tatian | 359/356 |
| 3,944,337 | 3/1976 | Ruben | 359/785 |
| 3,951,523 | 4/1976 | Nishimoto | 359/716 |
| 4,105,308 | 8/1978 | Owen, Jr. et al. | 359/785 |
| 4,494,819 | 1/1985 | Lidwell | 359/785 |
| 4,537,464 | 8/1985 | Boutellier | 359/785 |
| 4,871,219 | 10/1989 | Cooper | 359/356 |
| 5,028,967 | 7/1991 | Yamada et al. | 359/785 |
| 5,044,706 | 9/1991 | Chen | 359/356 |
| 5,202,792 | 4/1993 | Rollin | 359/356 |

FOREIGN PATENT DOCUMENTS

| | | |
|---|---|---|
| 1472189 | 1/1969 | Fed. Rep. of Germany . |
| 2519961 | 11/1975 | Fed. Rep. of Germany . |
| 2743175 | 4/1978 | Fed. Rep. of Germany . |
| 3726355 | 7/1989 | Fed. Rep. of Germany . |
| 299930 | 5/1992 | Fed. Rep. of Germany . |

OTHER PUBLICATIONS

J. Kross and R. Schuhmann, "Zur Korrektion optischer Systeme mit asphärischen Flächen" in Optik, vol. 70 (1985), pp. 76-85.

*Primary Examiner*—Martin Lerner
*Attorney, Agent, or Firm*—Lowe, Price, LeBlanc & Becker

[57] ABSTRACT

A three-lens objective has the following characteristics: A front lens consists of a first material of relatively low dispersion, a median lens consists of a second material of relatively larger dispersion, and a rear lens consists of a material of relatively low dispersion. The front lens has positive power, the median lens has negative power, and the rear lens has positive power. The spacing between front lens and median lens is substantially smaller than the distance between median lens and rear lens. Each of the lenses has at least one aspherical surface.

18 Claims, 18 Drawing Sheets

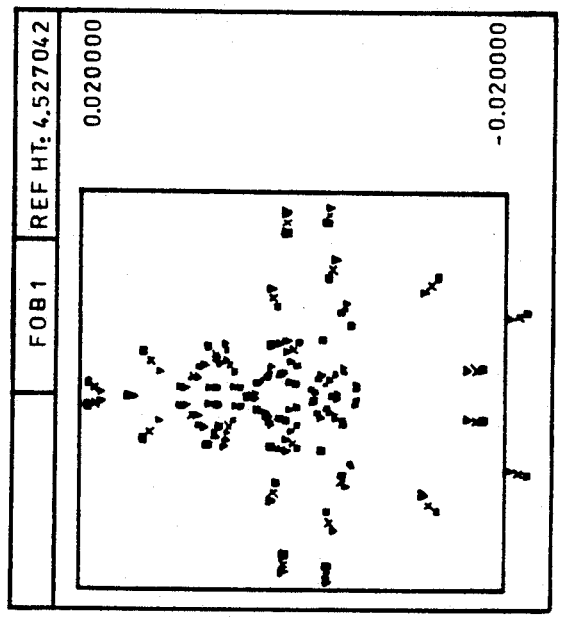
FIG. 7C
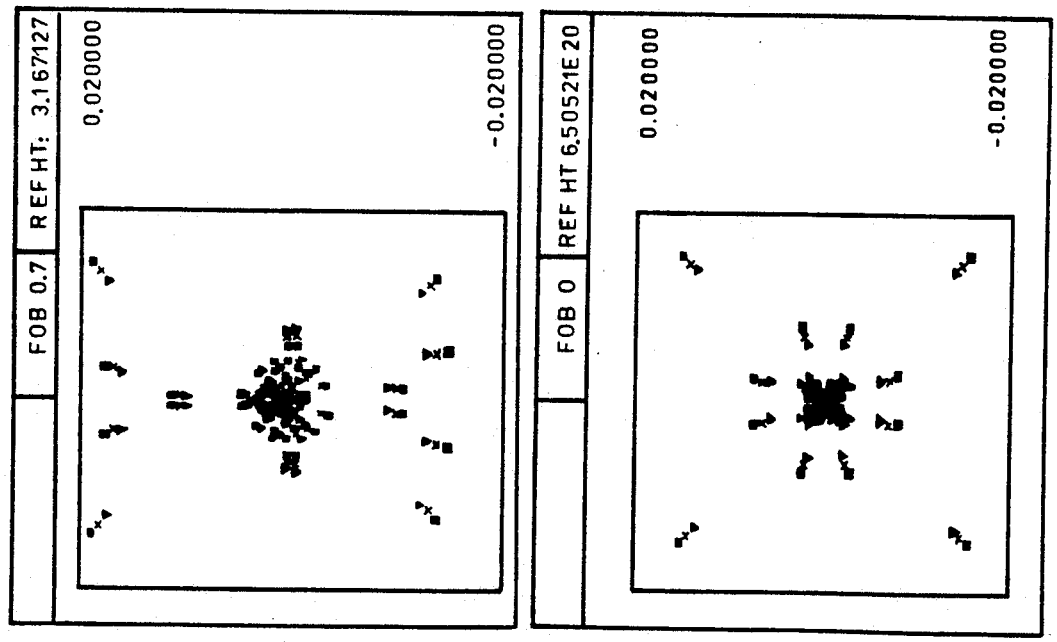
FIG. 7B
FIG. 7A

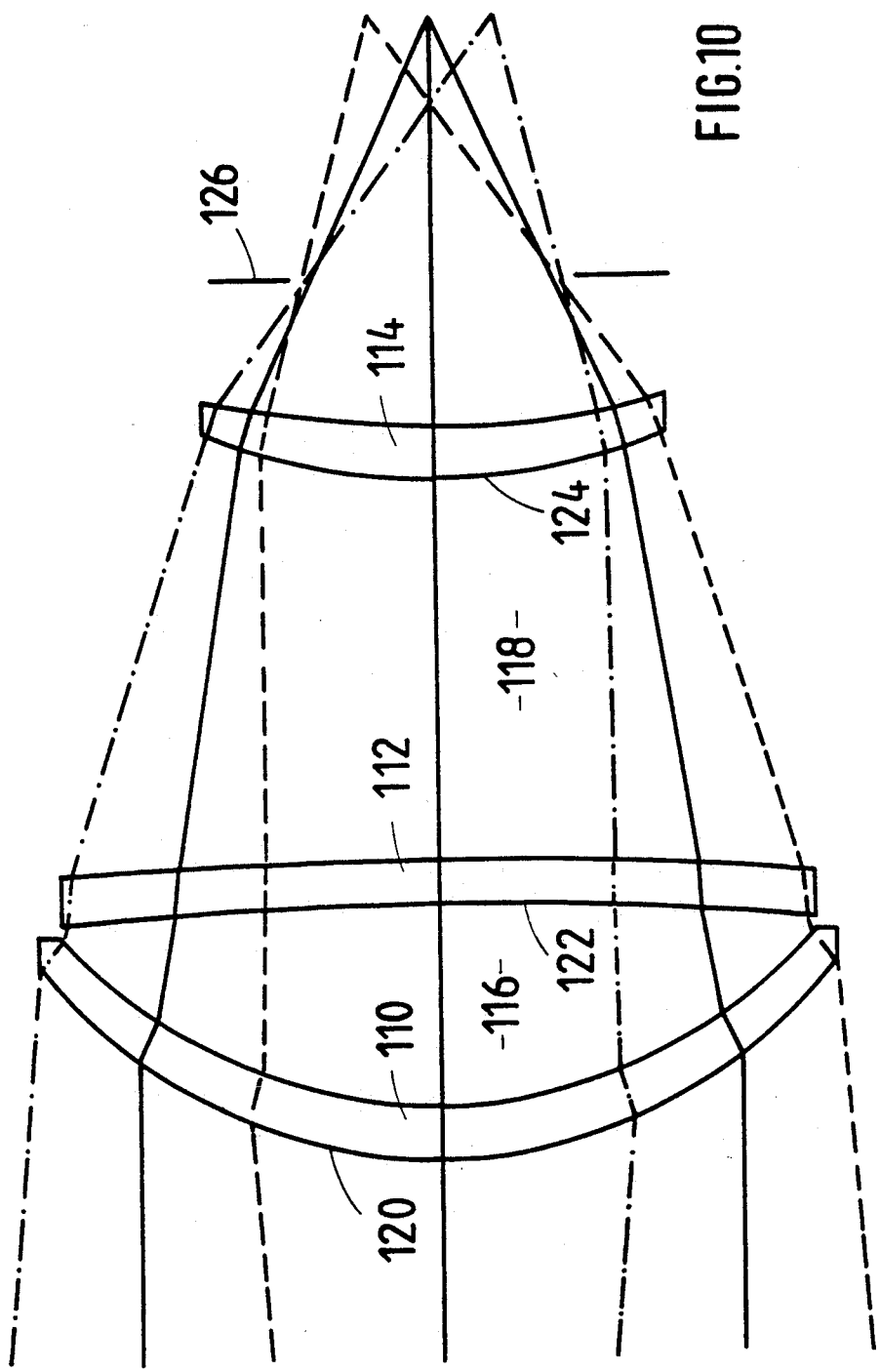

LARGE-APERTURE THREE-LENS OBJECTIVE WITH ASPHERICAL-SURFACES

TECHNICAL FIELD

The invention relates to a three-lens objective comprising three lenses and having a relatively long front focal length and a relatively short back focal length, each of said lenses having a front surface facing an object and a rear surface facing an image of said object.

Preferably, the invention relates to a three-lens objective for infrared spectral ranges, the objective having lenses of infrared-transparent materials.

The latter type of objectives is used, when infrared images having very small image points are to be formed all over an extended image area. A possible use of such objectives is in an infrared seeker wherein the image of a field of view if formed on a two-dimensional, image-detecting sensor and the picture elements (pixels) detected by the sensor are subjected to image processing. The following specifications of the objective are required for such uses:

The spectral range should lie between the wavelengths of 3 μm and 5 μm, for other applications between 8 μm and 12 μm.

The aperture should be large (f-number between 2.0 and 1.0)

The angle of field of view should be between +−2° and +−30°.

The image points should be nearly diffraction-limited.

The objective should be nearly temperature-compensated in a temperature interval from −40° C. to +60° C.

The number of lenses should be as small as possible.

The objective should have minimum overall length, the "overall length" of the objective being the spacing between the front surface of the objective and the image plane

BACKGROUND ART

The DE-A-1,472,189 (German laid-open patent application) describes a three-lens objective for infrared having two positive power lenses made of silicon and a negative power lens made of germanium therebetween. The two positive power lenses are menisci. The concave sides of these menisci face the shorter back or front focal length, respectively.

In this prior art objective, the spacings between the front lens and the median lens and between the median lens and the rear lens are approximately equal. All lenses are spherical. Thereby, the overall length of the objective becomes undesirably large.

The DE-A-2,519,961 also describes a three-lens objective for infrared. The three-lens objective comprises a single, positive power front lens in the form of a meniscus and made of germanium, and a rear lens element composed of two adjacent meniscus lenses convex towards the front. At least one of these rear meniscus lenses consists of germanium, as well. The rear surface of the front lens is aspherical. The remaining surfaces are spherical.

In this prior art three-lens objective, the median and rear lenses are closely adjacent.

The DE-A-3,726,355 relates to a bifocal optical infrared system in the form of a three-lens objective. The three-lens objective comprises a positive power front lens, a negative power medial lens and a rear lens having, again, positive power. The lenses consist of germanium. The rear surface of the front lens and the front surface of the rear lens are aspherical.

Also in this three-lens objective, the median and rear lenses are closely adjacent. Such closely adjacent median and rear lenses in three-lens objectives result in an increase of the overall length.

The DE-A-2,743,175 describes an infrared objective which consists of three mutually adjustable optical elements. The median and the rear optical elements, in turn, consist of two lenses each. The spacing of the median and rear optical elements is smaller than the spacing of the median optical element from the front one.

The DD-A-299,930 (German Democratic Republic patent) describes a four-lens infrared objective of the Petzval type.

A paper by J. Kross and R. Schuhmann "Zur Korrektion optischer Systeme mit asphärischen Flächen" in "Optik" Vol.70 (1985), 76–85, describes the correction of different lens systems by means of aspherical surfaces.

DISCLOSURE OF THE INVENTION

It is an object of the invention to provide a high-resolution objective with a minimum of lenses and with small overall length.

A more specific object of the invention is to provide a high-resolution objective for infrared ranges.

According to the invention, these and other objects are achieved with a three-lens objective of the type mentioned in the beginning, wherein a front one of said lenses consists of a first material of relatively low dispersion, a median one of said lenses consists of a second material of relatively larger dispersion, and a rear one of said lenses consists of a material of relatively low dispersion, said front lens has positive power, said median lens has negative power, and said rear lens has positive power, the spacing between said front lens and said median lens is substantially smaller than the distance between said median lens and said rear lens, and each of said lenses has at least one aspherical surface.

As can be gathered from the prior art discussed hereinbefore, the spacing of the three lenses in three-lens objectives from the respective neighboring lens are normally substantially equal. The smaller the spacing between the front and median lenses is, the poorer are the image points, if the lenses are spherical. The reason is that, if the median lens is placed close to the front lens, aberrations, in particular astigmatism and coma, are corrected by this median lens to a lesser degree. The median lens, virtually, corrects chromatic aberrations only. The invention is based on the discovery, that placing the median lens closer to the front lens, whereby the spacing between the median lens and the front lens is noticeably smaller than the spacing of the rear lens from the median lens, is feasible, if at least one of the surfaces of each lens is aspherical. By this arrangement of the lenses, in turn, reduced overall length as compared with prior art three-lens objectives is achieved.

Modifications of the invention are subject matter of the dependent claims.

Embodiments of the invention will be described in greater detail hereinbelow with reference to the accompanying drawings.

BRIEF DESCRIPTION OF THE DRAWINGS

FIG. 7 is similar to FIG. 4 and illustrates, for the various fractional object heights the piercing points of various parallelly incident rays through the focal plane of the three-lens objective illustrated in FIG. 2.

FIG. 10 illustrates a further embodiment of a three-lens objective designed in accordance with the basic principle explained above, this three-lens objective being appropriate for long-wavelength infrared and, in addition, permitting the provision stop behind the rear lens.

PREFERRED EMBODIMENTS OF THE INVENTION

Figure 1:
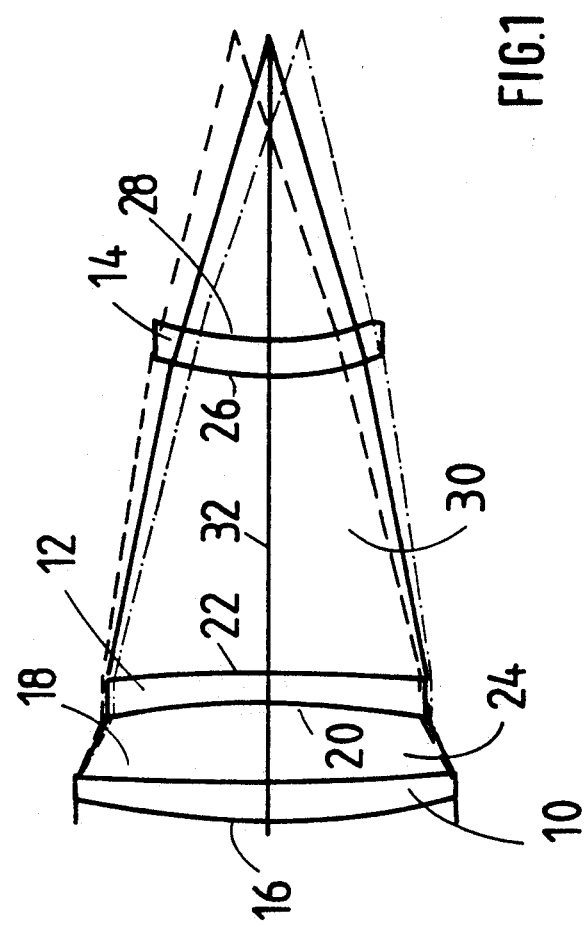
FIG. 1 shows a first embodiment of a three-lens objective for use in a spectral range between the wavelengths of 3.4 μm to 5.2 μm.

Referring to FIG. 1, a three-lens objective consists of three lenses, namely a front lens 10, a median lens 12 and a rear lens 14.

The front lens 10 consists of a first material which exhibits a relatively low dispersion in the spectral range of interest. In the present case, the first material is silicon. This material is transparent to infrared radiation in the spectral range of wavelengths between 3.4 μm and 5.2 μm. The front lens 10 has positive power. The front lens has a front surface 16 and a rear surface 18. The front surface 16 has a positive radius of curvature, i.e the surface 16 is convex towards the front. The front surface 16 is aspherical. The rear surface has also a positive radius of curvature, i.e. is dished towards the front. The radius of curvature of the front surface 16 of the front lens 10 is substantially smaller than the radius of curvature of the rear surface 18 of the front lens 10.

The median lens 12 consists of a second material, which exhibits a relatively large dispersion as compared with the material (silicon) of the front lens 10. In the present case, the second material is germanium. Also germanium is transparent in the spectral range from 3.4 μm to 5.2 μm. The median lens 12 has negative power. The median lens 12 has a front surface 20 and a rear surface 22. The front surface 20 has a negative radius of curvature, i.e. the surface 20 is dished towards the rear or concave. Also the front surface 20 of the median lens 12 is aspherical. Also the rear surface 22 of the median lens 12 has a negative radius of curvature, i.e. the rear surface 22 is convex as viewed from the rear. The amount of the radius of curvature of the front surface 20 is smaller than the amount of the radius of curvature of the rear surface 22.

The lenses 10 and 12 are spaced and define an air space 24 therebetween.

The rear lens 14 again consists of the first, relatively low dispersion material, thus of silicon. The rear lens 14 has positive power. The rear lens 14 has a front surface 26 and a rear surface 28. The front surface 26 has a positive radius of curvature. Also the rear surface 28 has a positive radius of curvature. The front surface 26 is aspherical. The radius of curvature of the front surface 26 of the rear lens 14 is smaller than the radius of curvature of the rear surface 28.

An air space 30 is defined between the median lens 12 and the rear lens 14. The distance between the front lens 10 and the median lens 12 is substantially smaller than the distance between the median lens 12 and the rear lens 14.

In detail, the data of the first embodiment of the three-lens objective are as follows:

TABLE I

| Surface | Lens Data | | | |
|---|---|---|---|---|
| | Radius | Thickness | Aperture Radius | Material |
| 1 | — | — | 25.576769 | Air |
| 2 | 95.775000 | 5.700000 | 25.576769 | Si |

TABLE I-continued

| | | | | | |
|---|---|---|---|---|---|
| 3 | 362.560000 | 9.800000 | 25.039522 | | Air |
| 4 | −115.480000 | 4.300000 | 21.969655 | | Ge |
| 5 | −296.400000 | 40.000000 | 22.070983 | | Air |
| 6 | 39.525000 | 5.000000 | 15.410790 | | Si |
| 7 | 40.973000 | 41.479150 | 13.972384 | | Air |
| 8 | — | — | 4.519556 | | Air |

Aspheric Surface Data

| | | | | | | |
|---|---|---|---|---|---|---|
| 2 | CC | −1.260288 | AD | −2.10940E-08 | AE | −4.82038E-11 |
| 4 | CC | −12.095072 | AD | 2.05607E-07 | AE | −3.62017E-11 |
| 6 | CC | −0.984138 | AD | 8.95639E 07 | AE | −2.08363E-11 |

Refractive Indices

| Surface | Material | N1 | N2 | N3 | Abbe-Dispersion Number |
|---|---|---|---|---|---|
| 1 | Air | — | — | — | — |
| 2 | Si | 3.424332 | 3.429186 | 3.421818 | 329.041382 |
| 3 | Air | — | — | — | — |
| 4 | Ge | 4.021400 | 4.034114 | 4.014581 | 154.677323 |
| 5 | Air | — | — | — | — |
| 6 | Si | 3.424332 | 3.429186 | 3.421818 | 329.041382 |
| 7 | Air | — | — | — | — |
| 8 | Air | — | — | — | — |

The first paragraph of Table 1 provides the lens data. The surfaces are characterized by consecutive numbers. Surface "2" is the front surface 16 of the front lens 10 in FIG. 1. Surface "3" is the rear surface 18 of the front lens 10. Surface "4" is the front surface 20 of the median lens 12. Surface "5" is the rear surface 22 of the median lens 12. Surface "6" is the front surface 26 of the rear lens 14. Surface "7" is the rear surface 28 of the rear lens 14. The radius of curvature is given for each surface, the radius of curvature being positive, when the surface is curved towards the front, and the radius of curvature being negative, when the surface is curved towards the rear. The "thickness" given is the distance of the respective surface from the next-following one, thus, for example, of the surface "2"(16) from the surface "3"(18).

The materials recited in the table refer to the material behind the respective surface.

A further paragraph states the aspheric surface data. The last paragraph states the refractive indices. Also here, the statements refer to the region behind the recited surfaces.

The tables given hereinbelow for other embodiments are structured correspondingly.

A three-lens objective having the above recited data exhibits the following characteristics:

TABLE 1A

Optical System Data

Field of View Angle (+/−Degree) = 2.828
F-Number (—) = 1.783
Focal Length (mm) = 91.196
Wavelengths [μm] = 4.300  3.400  5.200

Image Point Data

| Wavelength (μm) | FOB | Airy Diameter (μm) | Piercing Points Diameter 95% (μm) | Optical Path Difference 95% (μm) | Strehl Def. Ratio |
|---|---|---|---|---|---|
| 4.300 | — | 18.880 | 9.434 | 0.167 | 0.985 |
| 3.400 | — | 14.926 | 10.538 | 0.121 | 0.988 |
| 5.200 | — | 22.831 | 9.221 | 0.158 | 0.991 |
| Polychr | — | 18.879 | 9.657 | 0.153 | 0.987 |
| 4.300 | 0.700 | 18.914 | 8.675 | 0.101 | 0.995 |
| 3.400 | 0.700 | 14.953 | 11.876 | 0.229 | 0.956 |
| 5.200 | 0.700 | 22.873 | 8.569 | 0.098 | 0.996 |
| Polychr | 0.700 | 18.914 | 9.449 | 0.133 | 0.985 |
| 4.300 | 1.000 | 18.957 | 8.992 | 0.131 | 0.991 |
| 3.400 | 1.000 | 14.987 | 13.298 | 0.319 | 0.917 |

TABLE 1A-continued

| | | | | | |
|---|---|---|---|---|---|
| 5.200 | 1.000 | 22.925 | 9.009 | 0.139 | 0.993 |
| Polychr | 1.000 | 18.957 | 10.072 | 0.180 | 0.973 | the first paragraph of table 1A recites the characteristics of the whole three-lens objective. These characteristics are the angle of field of view, the f-number and the focal length.

The second paragraph of table 1A states the characteristics of the image points. It states, for different wavelengths of 4.300 μm, 3.400 μm and 5.200 μm and for polychromatic light, and at different fractional object heights, the Airy diameter, the diameter within which 95% of the piercing points of parallelly incident rays through the focal plane are located, the distance within which the optical path differences of 95% of the parallely incident rays lie, and the Strehl definition ratio.

Also the corresponding tables relating to other embodiments hereinbelow are structured in the same way.

The front lens 10 and the median lens 12 with different dispersions and opposite powers cause correction of chromatic aberrations. The rear lens substantially serves to correct astigmatism. Further correction of aberrations is achieved by the aspherical shape of the surfaces 16, 20 and 26.

All of the aspherical surfaces 16, 20 and 26 exhibit symmetry of revolution with respect to the optical axis 32 of the three-lens objective. The generatrix of the surface of revolution can be represented by a function $$Z(Y) = \frac{Y^2/R}{1 + \sqrt{1 - (CC + 1) Y^2/R^2}} + AD \cdot Y^4 + AE \cdot Y^6 + \ldots$$

wherein Z is the coordinate in the direction of the optical axis, Y is a coordinate in a direction orthogonal to the optical axis, R is the radius of curvature in the vertix, and AD and AE are the aspheric coefficients of fourth and sixth order, respectively. The values of R, CC, AD and AE are given in the table hereinbefore.

Figure 4C:
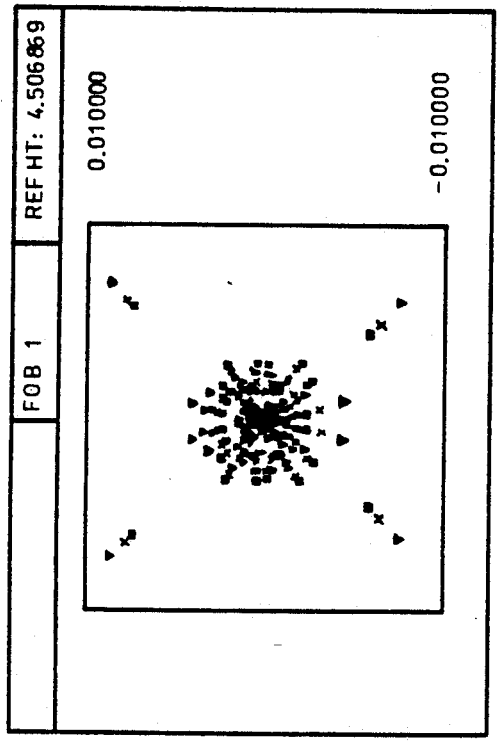
FIG. 4 illustrates, for the various fractional object heights the piercing points of various parallelly incident rays through the focal plane of the three-lens objective illustrated in FIG. 1.
Figure 4B:
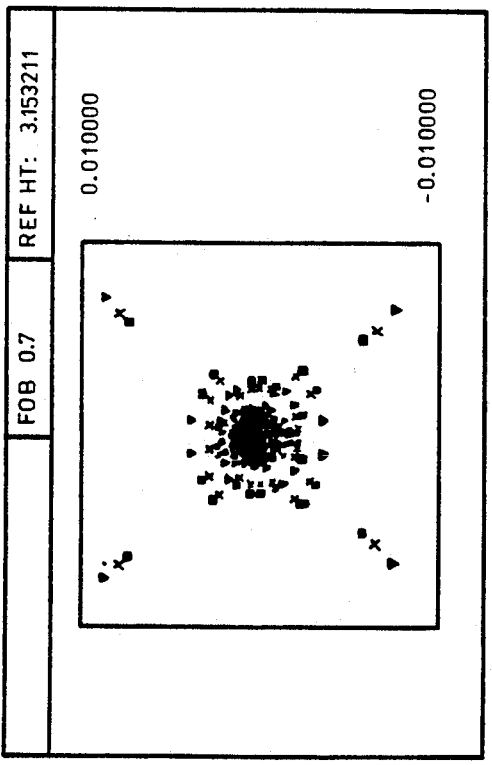
Figure 4A:
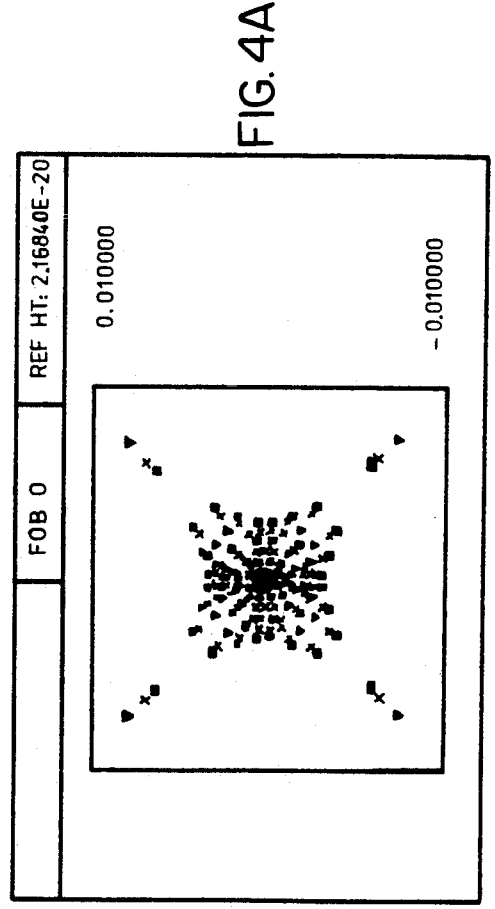

FIG. 4 shows for different fractional object heights FOB=0; 0.7 and 1 the piercing points of various incident parallel rays through the focal plane with a three-lens objective of FIG. 1. The picture point-height ratio is indicative of the deviation of the image point from the axis 32 referenced to the angle of the field of view. It will be noted, that for all fractional object heights 95% of all piercing points are located within a circle of 5 μm diameter. All piercing points are located within a circle of 15 μm diameter. The piercing points are represented by squares, crosses (+) and triangles to indicate long, medium and short wavelengths, respectively.

Figure 5:
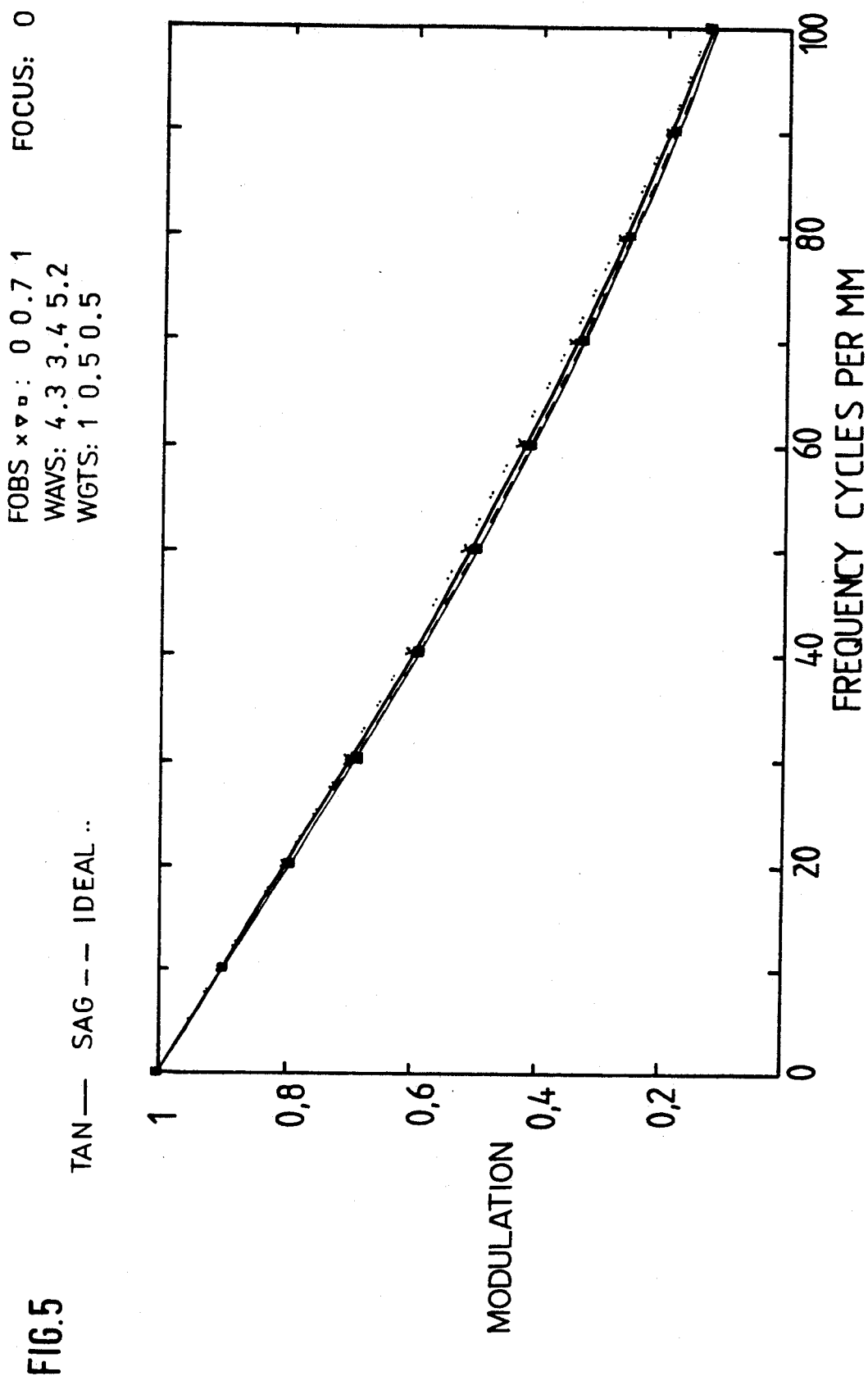
FIG. 5 shows the modulation transfer function obtained with the three-lens objective of FIG. 1.

FIG. 5 illustrates the modulation transfer function (MTF) for the three-lens objective. This modulation transfer function provides a measure of the quality of the image. If a sequence of parallel, sinusoidal, dark bars is imaged into the image plane, then the density of the bars (in bars per inch image plane) provides a "spatial frequency". This spatial frequency is the abscissa of the graphs of FIG. 5. The ordinate is the "modulation". This is the difference between the brightest and darkest locations in the image plane. With a coarse pattern, i.e. low "spatial frequency", the modulation has the value of "one". With finer patterns, i.e. higher spatial frequencies, the modulation descends, linearly even with ideal imaging. This is due to the diffraction limitation of the imaging. With real imaging, usually a "belly" sags relative to the dropping straight line. In FIG. 5, the descending straight line, which would correspond to the ideal imaging and diffraction limitation, is dotted. The solid and the dashed lines represent the modulation transfer function of the three-lens objective of FIG. 1 for tangential and sagittal sections. The modulation transfer function has been computed polychromatically with a weight 1 associated with the medium and a weight .5 associated with the boundary wavelengths.

Figure 6C:
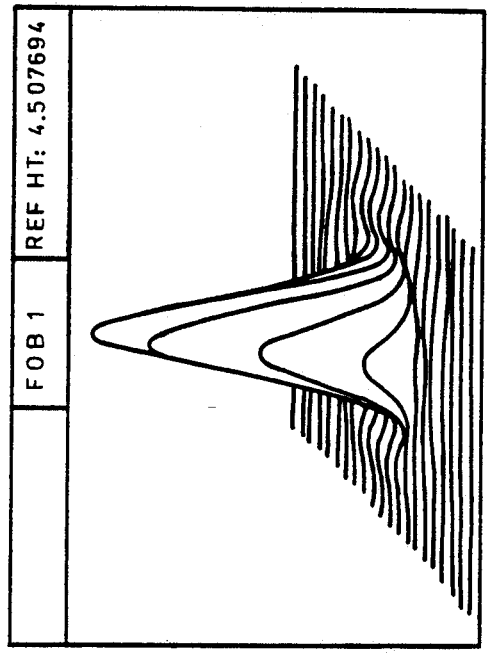
FIG. 6 shows the image point function for various fractional object heights obtained with a three-lens objective of FIG. 1.
Figure 6B:
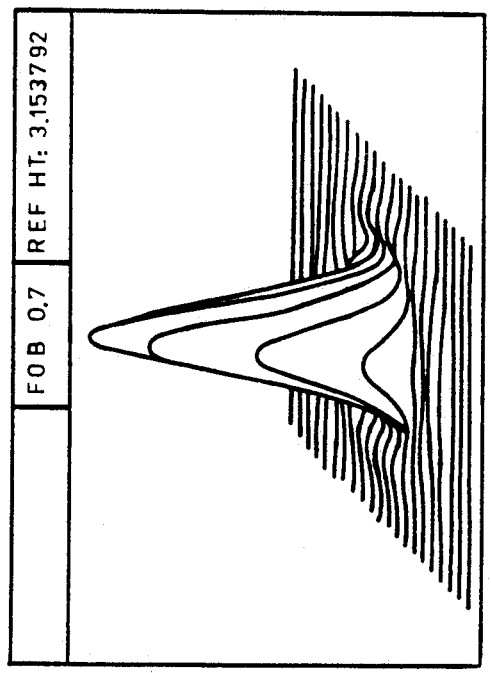
Figure 6A:
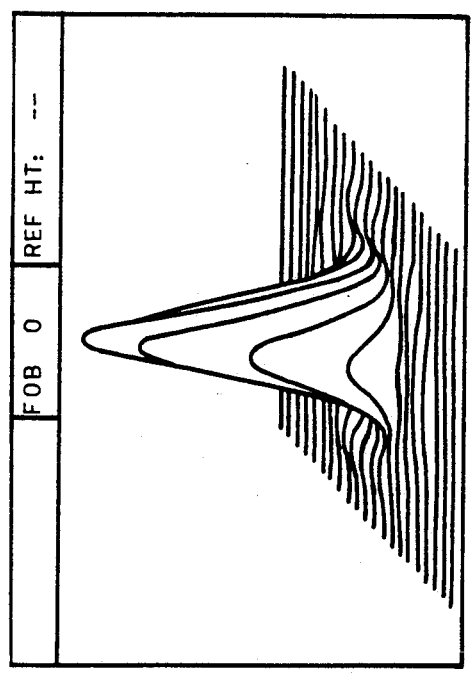

FIG. 6 illustrates, for the three-lens objective of FIG. 1, the image point function at different fractional object heights FOB. The image point function shows, for an imaged point light source, the light intensity as a function of position. The square illustrated in perspective in FIG. 6 has an edge length of 40 pm. Also here, the narrow limitation of the image point can be recognized. FIG. 6 also shows that the image point function remains virtually unchanged, if the fractional object height is changed.

Figure 2:
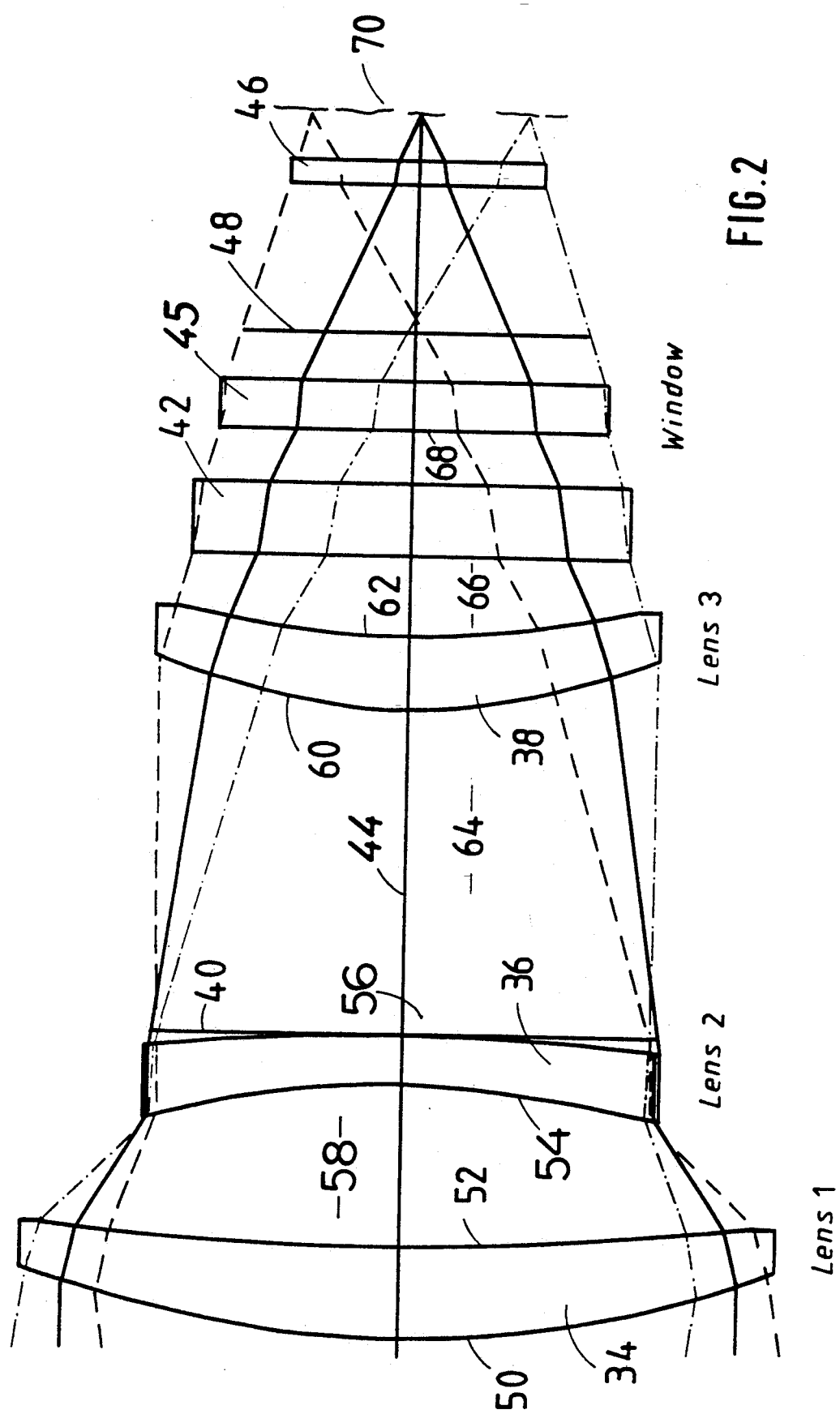
FIG. 2 shows a second embodiment of a three-lens objective for use in a spectral range between the wavelengths of 3.8 μm to 5.5 μm.

The three-lens objective of FIG. 2 has a front lens 34, a median lens 36 and a rear lens 38. Furthermore, an aperture stop 40 is arranged in the path of rays of this three-lens objective closely behind the median lens 36. A plane-parallel plate 42 is arranged in the converging path of rays on the image side of the rear lens 38. The surface normal of plate 42 forms a very small angle with the optical axis 44 of the three-lens objective. This plane-parallel plate 42 is arranged to be driven such that it rotates continuously about the optical axis and thus makes a wobbling movement. This causes a continuous gyrating movement of the image generated by the three-lens objective relative to the two-dimensional array of detector elements of the image detecting sensor. This permits, in well-known manner, to bridge the gaps between the detector elements. Thereby the resolution of a seeker constructed with such a three-lens objective is improved. As the plane-parallel plate is located in the converging path of rays, it has to be taken into account when computing the three-lens objective.

This is also true for a window 45 and a filter 46. The window seals the cooled sensor environment from atmosphere. The filter 46 keeps undesired radiation away from the detector. Numeral 48 designates a cooled light stop. The cooled light stop 48 keeps infrared radiation emitted by the environment of the detector itself away from the detector.

The front lens 34 consists of silicon. The front lens 34 has positive power. The front lens 34 has a front surface 50 and a rear surface 52. The front surface 50 has a positive radius of curvature. The front surface 50 is aspherical. Also the rear surface 52 has a positive radius of curvature. The radius of curvature of the front surface 50 of the front lens 34 is substantially smaller than the radius of curvature of the rear surface 52 of the front lens 34.

The median lens 36 consists of germanium. The medium lens 36 has negative power. The median lens 36 has a front surface 54 and a rear surface 56. The front surface 54 has a negative radius of curvature. The front surface 54 is aspherical. Also the rear surface has a negative radius of curvature. The front surface 54 of the median lens 36 has—as far as the amount is concerned—a smaller radius of curvature than the rear surface 56.

The lenses 34 and 36 are spaced and define an air space 58 therebetween.

The rear lens 38, again, consists of silicon. The rear lens 38 has positive power. The rear lens 38 has a front surface 60 and a rear surface 62. The front surface 60 has a positive radius of curvature. Also the rear surface 62 has a positive radius of curvature. The front surface 60 is aspheric. The radius of curvature of the front surface 60 of the rear lens 38 is smaller than the radius of curvature of the rear surface 62.

An air space 64 is defined between the median lens 36 and the rear lens 38. The distance between the front lens 34 and the median lens 36 is substantially smaller than the distance between the median lens 36 and the rear lens 38. An air space 66 is defined between the rear lens 38 and the plate 42. An air space is defined between the plate 42 and the window 45. The cooled light stop 48 is arranged at a distance behind the window 45. The filter 46 is arranged at a further distance behind the cooled light stop 48. The image of the field of view is generated in an image plane or focal plane 70. The plate 42 consists of silicon. The window 45 consists of germanium. The filter, again, consists of silicon.

The detailed data of the three-lens objective illustrated in FIG. 2 are as follows:

TABLE 2

Lens Data

| Srf | Radius | Thickness | Aperture Radius | Material |
|---|---|---|---|---|
| 1 | — | −13.003369 | 13.847083 | Air |
| 2 | 40.973000 | 4.000000 | 15.493000 | Si |
| 3 | 139.240000 | 6.450000 | 14.923000 | Air |
| 4 | −34.974000 | 2.000000 | 10.586000 | Gel |
| 5 | −102.180000 | — | 10.609000 | Air |
| 6 | — | — | 10.444000A | |
| 7 | — | 13.300000 | 10.444000 | Air |
| 8 | 23.544000 | 3.000000 | 10.324000 | Si |
| 9 | 35.481000 | 3.500000 | 9.695000 | Air |
| 10 | — | 3.000000 | 8.999000 | Si Scanner |
| 11 | — | 2.197175 | 8.728000 | Air |
| 12 | — | 2.000000 | 8.005000 | Ge Window |
| 13 | — | 2.000000 | 7.851000 | Air |
| 14 | — | — | 7.204000 | |
| 15 | — | 6.000000 | 7.204000 | Air |
| 16 | — | — | 5.263000 | |
| 17 | — | — | 5.263000 | Air |
| 18 | — | 1.000000 | 5.263000 | Si |
| 19 | — | 2.000000 | 5.173000 | Air |
| 20 | — | — | 4.526000 | Air |

Aspheric Surface Data

| | | | | | | |
|---|---|---|---|---|---|---|
| 2 | CC | −0.974975 | AD | −3.32409E-07 | AE | 2.23708E-11 |
| 4 | CC | −10.283235 | AD | −7.33080E-07 | AE | 2.38799E-09 |
| 8 | CC | −0.989312 | AD | −3.82908E-06 | AE | 6.37996E-10 |

Refractive Indices

| Srf | Material | N1 | N2 | N3 | Abbe-Disperson Number |
|---|---|---|---|---|---|
| 1 | Air | — | — | — | — |
| 2 | Si | 3.423380 | 3.426478 | 3.421153 | 455.143820 |
| 3 | Air | — | — | — | — |
| 4 | Ge | 4.018807 | 4.027057 | 4.012839 | 212.321165 |
| 5 | Air | — | — | — | — |
| 6 | | 1.000000 | 1.000000 | 1.000000 | — |
| 7 | Air | — | — | — | — |
| 8 | Si | 3.423380 | 3.426478 | 3.421153 | 455.143820 |
| 9 | Air | — | — | — | — |
| 10 | Si | 3.423380 | 3.426478 | 3.421153 | 455.143820 |
| 11 | Air | — | — | — | — |
| 12 | Ge | 4.018807 | 4.027057 | 4.012839 | 212.321165 |
| 13 | Air | — | — | — | — |
| 14 | | 1.000000 | 1.000000 | 1.000000 | — |
| 15 | Air | — | — | — | — |
| 16 | | 1.000000 | 1.000000 | 1.000000 | — |
| 17 | Air | — | — | — | — |
| 18 | Si | 3.423380 | 3.426478 | 3.421153 | 455.143820 |
| 19 | Air | — | — | — | — |

TABLE 2-continued

| 20 | Air | — | — | — | — |

A three-lens objective having the above recited data exhibits the following characteristics:

TABLE 2A

Optical System Data

Field of View Angle (+/−Degree) = 7.755
F-Number (—) = 1.201
Focal Length (mm) = 33.266
Wavelengths [μm] = 4.600  3.800  5.500

Image Point Data

| Wave-length (μm) | FOB | Airy Diameter (μm) | Piercing Points Diameter 95% (μm) | Optical Path Difference 95% (μm) | Strehl-Def Ratio |
|---|---|---|---|---|---|
| 4.600 | — | 13.579 | 17.954 | 0.143 | 0.991 |
| 3.800 | — | 11.218 | 16.881 | 0.139 | 0.987 |
| 5.500 | — | 16.236 | 18.956 | 0.141 | 0.994 |
| Polychr | — | 13.653 | 17.936 | 0.141 | 0.990 |
| 4.600 | 0.700 | 13.701 | 24.786 | 0.407 | 0.926 |
| 3.800 | 0.700 | 11.317 | 23.784 | 0.401 | 0.896 |
| 5.500 | 0.700 | 16.382 | 25.790 | 0.422 | 0.944 |
| Polychr | 0.700 | 13.775 | 24.787 | 0.409 | 0.923 |
| 4.600 | 1.000 | 13.863 | 36.624 | 0.862 | 0.707 |
| 3.800 | 1.000 | 11.451 | 36.368 | 0.861 | 0.603 |
| 5.500 | 1.000 | 16.577 | 36.899 | 0.858 | 0.787 |
| Polychr | 1.000 | 13.938 | 36.628 | 0.861 | 0.701 |

The three lenses 34, 36 and 38 of the second embodiment of the three-lens objective described above with reference to FIG. 2 cooperate in the same way as the three lenses in the first embodiment of FIG. 1. The values of cc have the same meaning as has been explained above by means of the formula with reference to the embodiment of FIG. 1.

Figure 8:
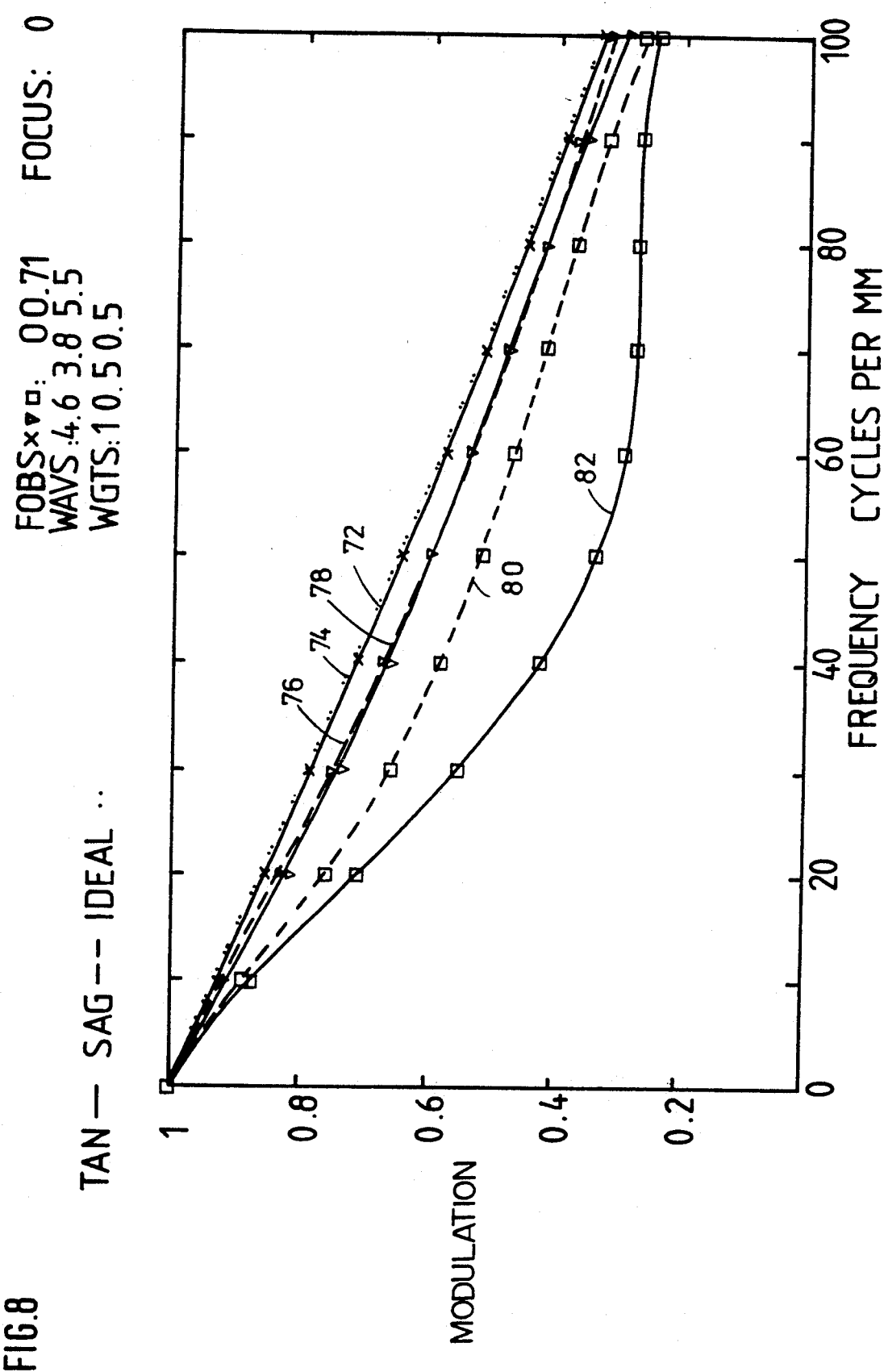
FIG. 8 is similar to FIG. 5 and shows the modulation transfer function for tangential and sagittal rays obtained with the three-lens objective of FIG. 1.
Figure 9C:
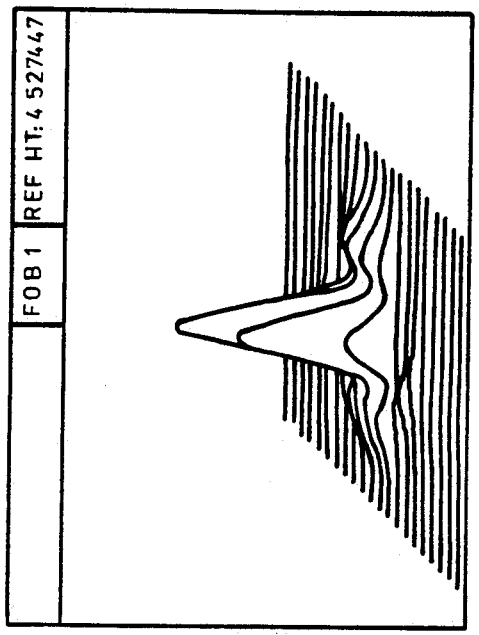
FIG. 9 is similar to FIG. 6 and shows the image point function for various fractional object heights obtained with a three-lens objective of FIG. 2.
Figure 9B:
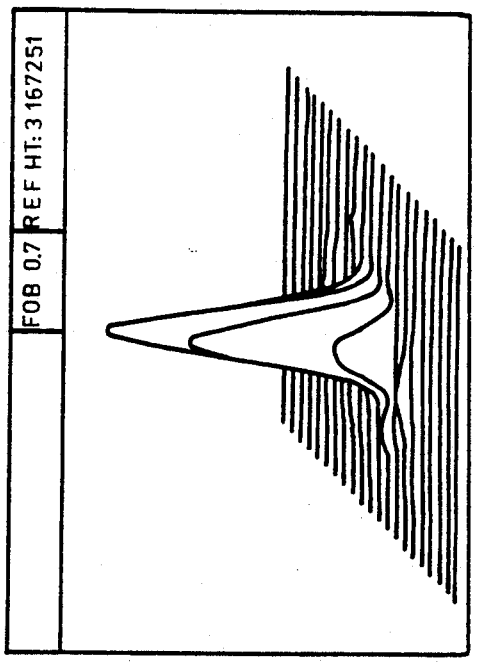
Figure 9A:
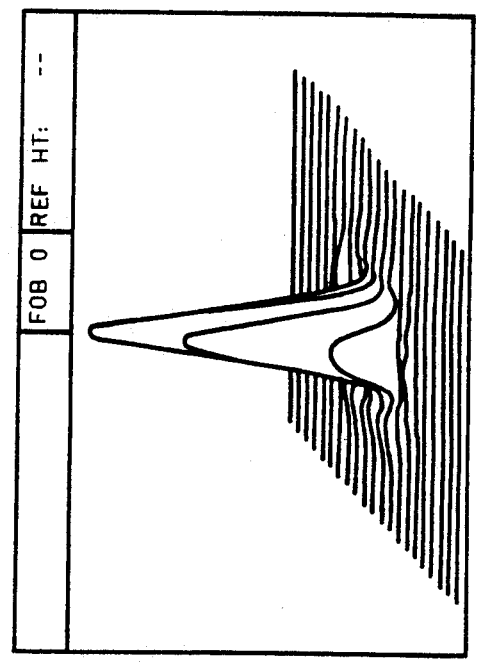

FIGS. 7 to 9 illustrate in a similar way as FIGS. 4 to 6 the quality of the image on the basis of the "ray piercing points", the modulation transfer functions and the image functions.

It will be recognized from a comparison of FIG. 4 and FIG. 7, that for the fractional object heights FOB=0 and FOB=0.7 the three-lens objective of FIG. 2 is similarly good, as far as the piercing points are concerned, as the three-lens objective of FIG. 1. It is, however, to be noted that the square fields in FIG. 4 have an edge length of 20 μm, while in FIG. 7 the edge length is 40 μm. Near the edge of the field of view, the ray piercing points are more widely spread.

The image function shows a similar waveform. With an fractional object height of FOB=0 and FOB=.7, the image function exhibits high and rather sharp peaks. With an fractional object height of one, i.e. for the marginal areas of the field of view, the peak of the image function is lower and wider.

FIG. 8 shows the modulation transfer function of the three-lens objective of FIG. 2 for tangential and sagittal rays and for different image point-height ratios FOB. The dotted, descending, straight line shows the ideal shape, as resulting merely from the diffraction limitation of the image. The solid line 74 is obtained for the fractional object height FOB=0. This graph nearly coincides with the ideal shape of the modulation transfer function. The dashed graph 76 is obtained for sagittal rays and an image point height ratio of FOB=0.7. This graph 76 deviates slightly, though not heavily, from the ideal shape of the graph. The solid graph 78 is obtained for tangential rays and an fractional object height of FOB=0.7. This graph 78 coincides to a large extent with the graph 76. The dashed graph 80 is obtained for sagittal rays and an fractional object height of FOB=1. The solid graph 82 is obtained for tangential rays and an fractional object height of FOB=1. As compared with the ideal shape, the graphs 80 and 82, in particular graph 82, exhibit a heavily sagging "belly".

It results therefrom, that, with the three-lens objective of FIG. 2, the image quality deteriorates towards the edge of the field of view or field of image, respectively. Comparison of the data of Table 1 and Table 2 shows, however, that the angle of the field of view of the three-lens objective of FIG. 1 is 2.828°, while the angle of the field of view of the three-lens objective of FIG. 2 is 7.755°. Thus the three-lens objective of FIG. 2 is a wide angle objective.

Figure 3:
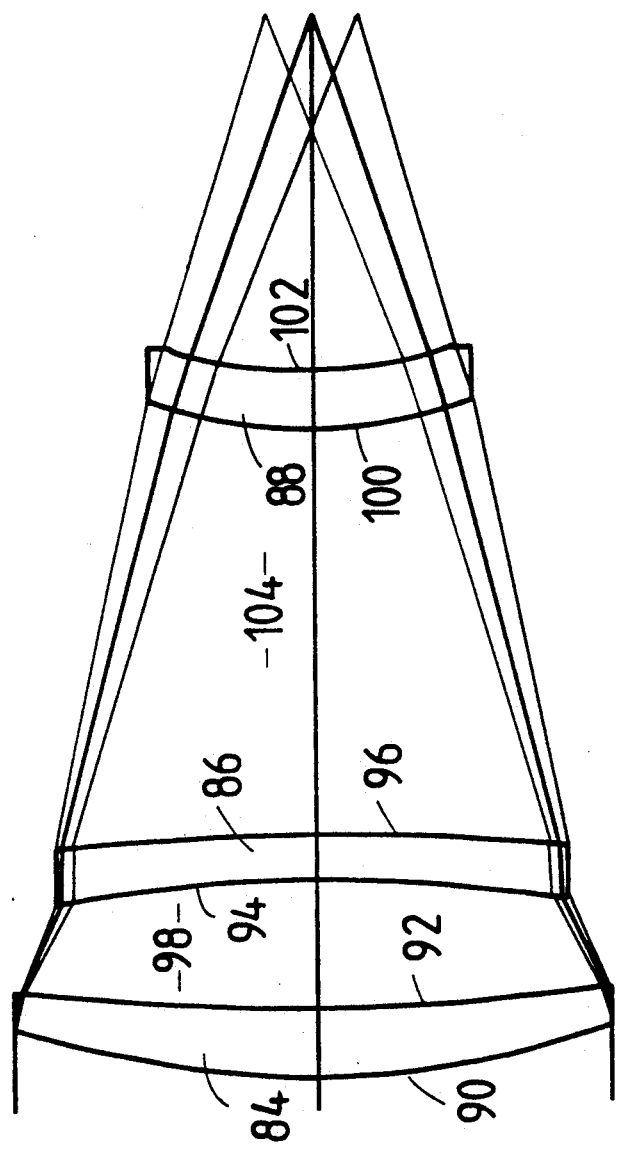
FIG. 3 shows a third embodiment of a three-lens objective for use in a spectral range between the wavelengths of 8 μm to 12 μm.

A further three-lens objective, which is designed in accordance with the same principle as the three-lens objectives of FIG. 1 and FIG. 2, is illustrated in FIG. 3.

The three-lens objective of FIG. 3 has a front lens 84, a median lens 86 and a rear lens 88.

The front lens 84 consists of a first material which, in the spectral range of interest, exhibits a relatively low dispersion ("relative" as compared with the material of the median lens 86).In the present case, this first material is germanium. This material is transparent to infrared radiation in the spectral range of interest from wavelengths of 8 μm to 12 μm. The front lens 84 has positive power. The front lens has a front surface 90 and a rear surface 92. The front surface has a positive radius of curvature. The front surface 90 is aspherical. Also the rear surface 92 has a positive radius of curvature. The radius of curvature of the front surface 90 of the front lens 84 is substantially smaller than the radius of curvature of the rear surface 92 of the front lens 84.

The median lens 86 consists of a second material, which exhibits a relatively large dispersion as compared with the first material germanium of which the front lens 84 consists. In the present case, the second material is zinc selenide. Also zinc selenide is transparent in the spectral range of wavelengths from 8 μm to 12 μm. The median lens has a front surface 94 and a rear surface 96. The front surface has a negative radius of curvature. The front surface 94 of the median lens 86 is aspherical. Also the rear surface 96 of the median lens 86 has a negative radius of curvature. The front surface 94 of the median lens 84—as far as the amount is concerned—has a smaller radius of curvature than the rear surface 96.

The lenses 84 and 86 are spaced and define an air space 98 therebetween.

The rear lens 88, again, consists of the first material of relatively low dispersion. This is germanium. The rear lens 88 has positive power. The rear lens has a front surface 100 and a rear surface 102. The front surface 100 has a positive radius of curvature. The rear surface 102 has also a positive radius of curvature. The front surface 100 is aspherical. The radius of curvature of the front surface 100 of the rear lens 88 is smaller than the radius of curvature of the rear surface 102.

An air space 104 is defined between the median lens 86 and the rear lens 88. The distance between the front lens 84 and the median lens 86 is substantially smaller than the distance between the median lens 86 and the rear lens 88.

When considering the three three-lens objectives which are illustrated in FIG. 1, FIG. 2 and FIG. 3, it will be recognized that these three three-lens objectives have a unitary basic structure. This can also be gathered from the description hereinbefore. Also a comparison of Table 1 and Table 2 reveals a plurality of conformities between the two three-lens objectives of FIG. 1 and FIG. 2.

In all cases, the front surface of the front lens has a substantially smaller radius of curvature than the rear surface of the front lens. The radii of both surfaces are positive. According to table 1 and table 2, the radius of curvature of the front surface of the front lens is about one fourth to one third of the radius of curvature of the rear surface. With respect to the surfaces 16 and 18 in FIG. 1, the ratio is 95.8:362.6=0.264. With respect to the surfaces 50 and 52 in FIG. 2, the ratio is 40.97:139.24=294.

In all cases, the front surface of the median lens has a smaller radius of curvature—as far as the amount is concerned- than the rear surface. The radii of curvature of both surfaces are negative. The radius of curvature of the front surface of the median lens is about one third of the rear surface. With respect to the surfaces 20 and 22 in FIG. 1, the ratio is −115.5:−296.4=0.39. With respect to the surfaces 54 and 56 in FIG. 2, the ratio is 35:102=0.343.

The front surface of the rear lens has a smaller radius of curvature than the rear surface. The radii of curvature of both surfaces are positive. The radii of curvature of both surfaces are in the same order of magnitude. At lens 14 in FIG. 1, the two radii of curvature are 39.525 for surface 26 and 40.973 for surface 28. These radii of curvature are substantially equal. At the lens 38 in FIG. 2, the two radii of curvature are 23.544 for surface 60 and 35.481 for surface 62. The ratio of these two radii of curvature is about 2:3.

Also the amounts of the radii of curvature of the front surfaces of the front and median lenses are in the same order of magnitude: In table 1 and FIG. 1, the radius of curvature of surface 16 is 95.7. The radius of curvature of surface 20 is—as far as the amount is concerned—115.5. The ratio is about 1.2. In table 2 and FIG. 2, the radius of curvature of the surface 50 is 40.97. The radius of curvature of the surface 54 is—as far as the amount is concerned—34.97. The ratio is 1.17.

The thicknesses of the air spaces 30 and 64 are a multiple of the respective thicknesses of the associated air spaces 24 and 58, respectively, namely about four or two times, respectively, of these thicknesses.

In the embodiments described hereinbefore, the front surfaces of the lenses are aspherical. However also the rear surfaces may be aspherical, or the front surface of one lens or some lenses and the rear surface of the remaining lens or lenses. Providing a lens with two aspherical surface presents manufacturing problems.

The three-lens objective of FIG. 10 consists of a front lens 110 of germanium, a median lens 112 of zinc selenide, and a rear lens 114 again of germanium. The front lens 110 has positive power. The median lens 112 has negative power. The rear lens 114, again, has positive power. An air space 116 is defined between the front lens 110 and the median lens 112. An air space 118 is defined between the median lens 112 and the rear lens 114. The distance of the median lens 112 from the front lens 110 is substantially smaller than the distance of the rear lens 114 from the median lens 112. The front surface 120 of the front lens 110, the front surface of the median lens 112 and the front surface 124 of the rear lens 114 are aspherical.

The three-lens objective of FIG. 10 is appropriate for long-wavelength infrared radiation with a wavelength range between 8 μm and 12 μm. The path of rays is such that an aperture stop 126 can be arranged behind the rear lens 114. This aperture stop 126 can then be a "cold light stop", if the three-lens objective is used in a seeker having a cooled sensor, the light stop being cooled down to low temperatures. Such a cold light stop 126 ensures that the sensor is exposed substantially to pure useful radiation.

In detail, the three-lens objective of FIG. 10 has the following data:

TABLE 3

| Lens Data | | | | | |
|---|---|---|---|---|---|
| Srf | Radius | Thickness | Aperture Radius | Glass | Notes |
| 1 | — | −177.23730 | 41.66667 | Air | |
| 2 | 70.01694 | 7.47307 | 55.00000 | Ge | 1. Lens |
| 3 | 71.50233 | 27.00000 | 52.43139 | Air | |
| 4 | −517.42425 | 5.63758 | 52.00000 | ZNSE | 2. Lens |
| 5 | −743.63318 | 52.44256 | 52.00000 | Air | |
| 6 | 85.02567 | 6.55532 | 32.00000 | Ge | 3. Lens |
| 7 | 112,74740 | 6.74923 | 31.00000 | Air | |
| 8 | — | 50.38182 | 22.27019A | Air | |
| 9 | — | — | 10.98252 | Air | Focal Plane |

| Special and Aspheric Data | | |
|---|---|---|
| 2 | CC | −0.06772 |
| 4 | CC | −16.82474 |
| 6 | CC | −0.28703 |

| Refractive Indices | | | | | |
|---|---|---|---|---|---|
| Srf | Glass | N1 | N2 | N3 | V |
| 1 | Air | — | — | — | — |
| 2 | Ge | 4.00420 | 4.00560 | 4.00190 | 811.81345 |
| 3 | Air | — | — | — | — |
| 4 | ZnSe | 2.41220 | 2.41726 | 2.39296 | 58.12443 |
| 5 | Air | — | — | — | — |
| 6 | Ge | 4.00420 | 4.00560 | 4.00190 | 811.81345 |
| 7 | Air | — | — | — | — |
| 8 | Air | — | — | — | — |
| 9 | Air | — | — | — | — |

A three-lens objective having the above recited data exhibits the following characteristics:

TABLE 3A

| Optical System Data | | | | | |
|---|---|---|---|---|---|
| Field of View Angle (+/−Degree) = | | 5.000 | | | |
| F-Number (—) = | | 1.200 | | | |
| Foca Length (mm) = | | 100.000 | | | |
| Wavelengths (μm) = | | 9.000 | 8.000 | 12.000 | |

| Image Point Data | | | | | |
|---|---|---|---|---|---|
| Wavelength (μm) | FOB | Airy Diameter (μm) | Piercing Points Diameter 95% (μm) | Optical Path Difference 95% (μm) | Strehl-Def. Ratio |
| 9.000 | — | 26.578 | 35.066 | 1.511 | 0.757 |
| 8.000 | — | 23.619 | 13.587 | 0.498 | 0.962 |
| 12.000 | — | 35.447 | 19.531 | 0.836 | 0.953 |
| Polychr | — | 28.055 | 25.812 | 1.089 | 0.858 |
| 9.000 | 0.700 | 26.589 | 34.011 | 1.277 | 0.820 |
| 8.000 | 0.700 | 23.627 | 26.280 | 0.841 | 0.897 |
| 12.000 | 0.700 | 35.461 | 24.080 | 0.787 | 0.958 |
| Polychr | 0.700 | 28.066 | 29.596 | 1.046 | 0.874 |
| 9.000 | 1.000 | 26.575 | 33.940 | 1.393 | 0.789 |
| 8.000 | 1.000 | 23.615 | 51.801 | 2.153 | 0.489 |
| 12.000 | 1.000 | 35.443 | 49.551 | 2.008 | 0.759 |
| Polychr | 1.000 | 28.052 | 42.308 | 1.736 | 0.707 |

Figure 11C:
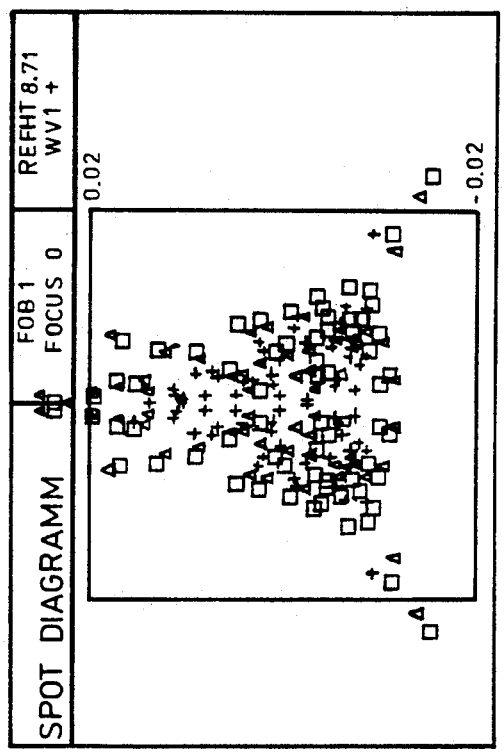
FIG. 11 is similar to FIG. 4 and illustrates, for the various fractional object heights the piercing points of various parallelly incident rays through the focal plane of the three-lens objective illustrated in FIG. 10.
Figure 11B:
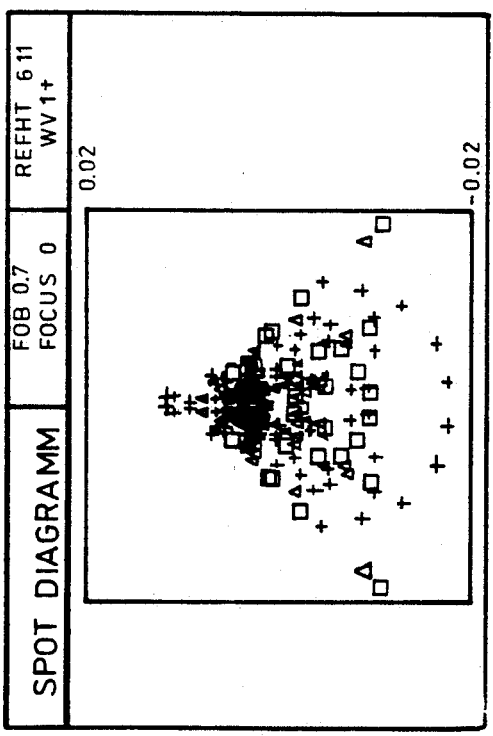
Figure 11A:
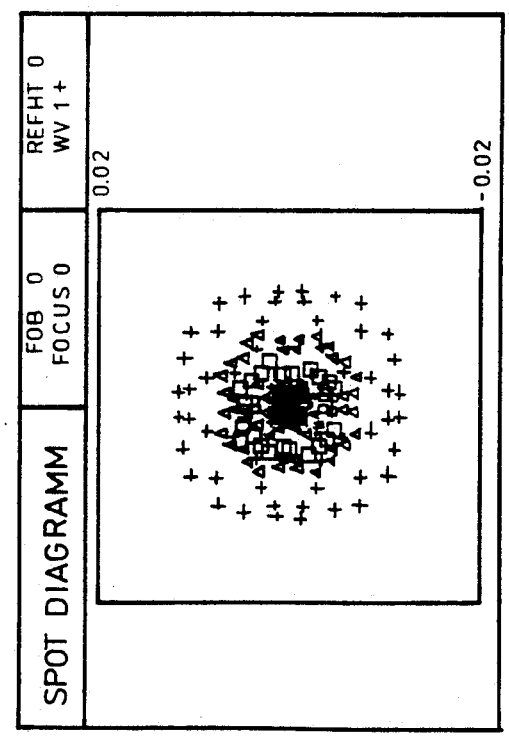

FIG. 11 is a diagram similar to FIG. 4 and illustrates for a number of fractional object heights FOB=0; FOB=0.6 and FOB=1 the piercing points of the various parallelly incident rays through the focal plane in a three-lens objective of FIG. 10.

Figure 12:
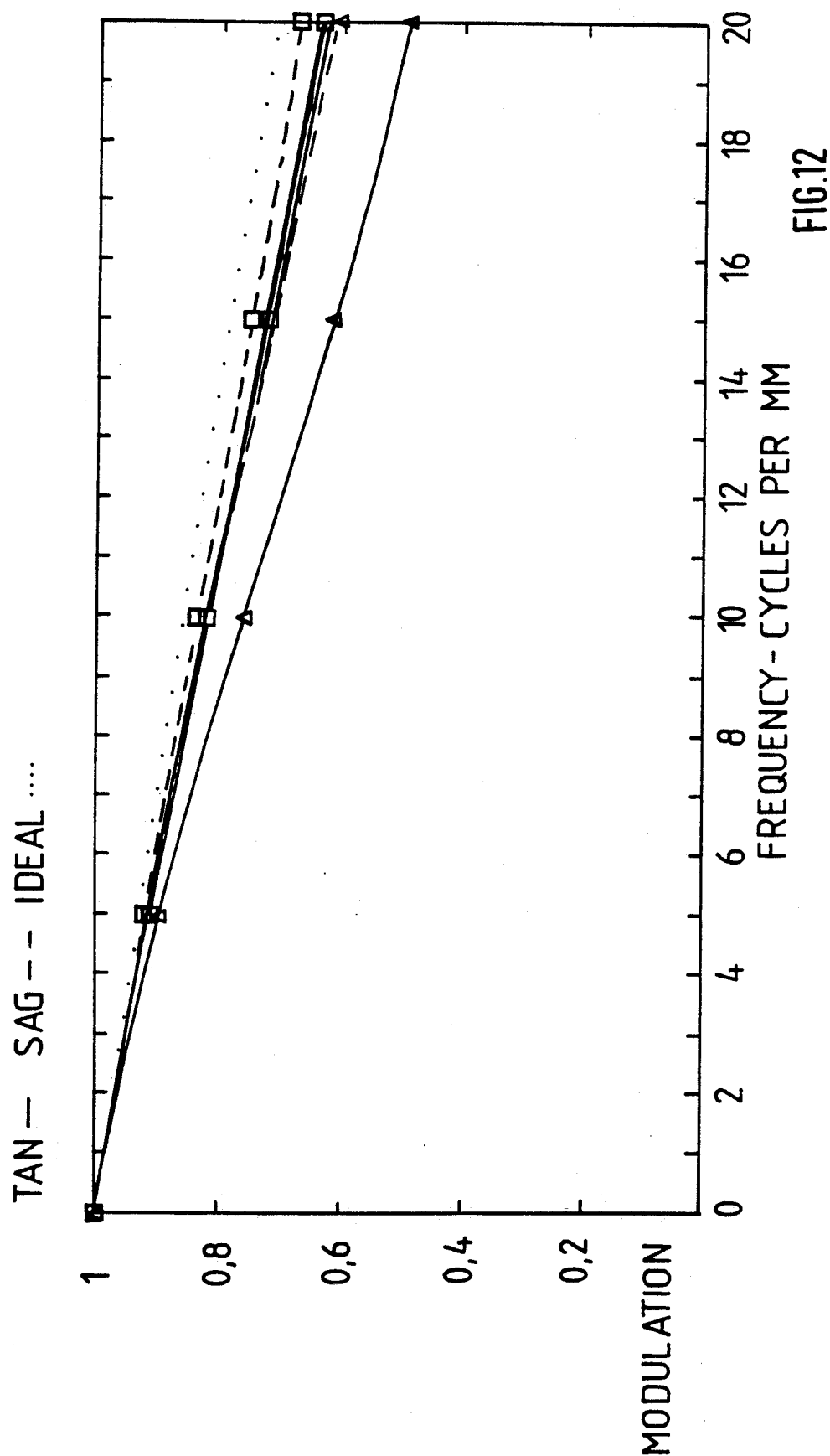
FIG. 12 is similar to FIG. 5 and shows the modulation transfer function for tangential and sagittal rays obtained with the three-lens objective of FIG. 10.

FIG. 12 is a diagram similar to FIG. 5 and illustrates for three different fractional object heights 0; 0.7 and 1 the modulation transfer function for tangential and sagittal rays in a three-lens objective of FIG. 10. The graphs pertaining to the fractional object height F=0 are marked by a cross (+), the graphs pertaining to FOB=0.7 are marked by a square, and the graphs pertaining to FOB=1 are marked by a triangle. The graphs for tangential rays are drawn with solid lines. The graphs for sagittal rays are drawn with dashed lines. The ideal graphs are drawn with dotted lines.

Figure 13:
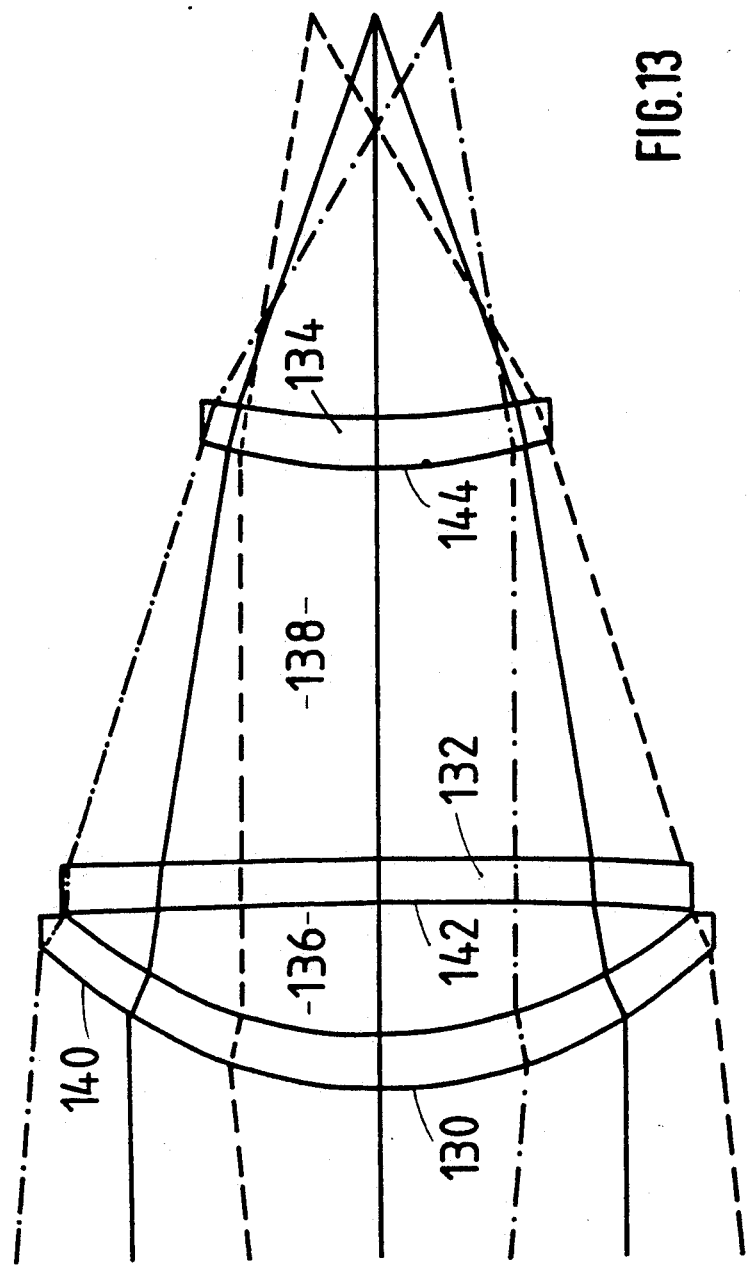
FIG. 13 shows a modified embodiment of a three-lens objective, which is composed of germanium and zinc selenide lenses and, therefore, appropriate for long-wavelength infrared, and which permits an aperture stop to be placed behind the rear lens.

FIG. 13 shows a three-lens objective having a front lens 130, a median lens 132 and a rear lens 134. The front lens 130 consists of germanium, the median lens 132 consists of zinc selenide, and the rear lens consists of germanium again. The front lens 130 has positive power, the median lens 132 has negative power, and the rear lens 134 has positive power again. An air space 136 is defined between the front lens 130 and the median lens 132. An air space 138 is defined between the median lens 132 and the rear lens 134. The distance of the median lens 132 from the front lens 130 is substantially smaller than the distance of the rear lens 134 from the median lens 132. The front surface 140 of the front lens 132, the front surface 142 of the median lens 132 and the front surface 144 of the rear lens are aspherical.

Also the three-lens objective of FIG. 13 is appropriate for long-wavelength infrared in a wavelength range between 8 μm and 12 μm. Also here, the path of rays is such that an aperture stop can be arranged behind the rear lens 134.

In detail, the data of the three-lens objective of FIG. 13 are as follows:

TABLE 4

Lens Data

| Srf | Radius | Thickness | Aperture Radius | Glass | Notes |
|---|---|---|---|---|---|
| 1 | — | −156.29093 | 33.33333 | Air | |
| 2 | 64.24548 | 7.47307 | 45.50000 | Ge | 1. Lens |
| 3 | 65.75754 | 17.00000 | 42.74139 S | Air | |
| 4 | −670.00482 | 5.63758 | 42.50000 | ZnSe | 2. Lens |
| 5 | −1105.21495 | 52.44256 | 42.50000 | Air | |
| 6 | 74.24877 | 6.55532 | 23.50000 | Ge | 3. Lens |
| 7 | 89.57195 | 4.00000 | 22.00000 | Air | |
| 8 | — | 50.38182 | 17.81615A | Air | |
| 9 | — | — | 8.78602 | Air | Focal Plane |

Special and Aspheric Data

| 2 | CC | −0.06463 |
|---|---|---|
| 4 | CC | −91.21630 |
| 6 | CC | −0.37256 |

Refractive Indices

| Srf | Glass | N1 | N2 | N3 | V |
|---|---|---|---|---|---|
| 1 | Air | — | — | — | |
| 2 | Ge | 4.00420 | 4.00560 | 4.00190 | 811.81345 |
| 3 | Air | — | — | — | |
| 4 | ZnSe | 2.41220 | 2.41726 | 2.39296 | 58.12443 |
| 5 | Air | — | — | — | |
| 6 | Ge | 4.00420 | 4.00560 | 4.00190 | 811.81345 |
| 7 | Air | — | — | — | |
| 8 | Air | — | — | — | |
| 9 | Air | — | — | — | |

A three-lens objective having the above recited data exhibits the following characteristics:

TABLE 4A

Optical System Data

Field of View Angle (+/−Degree) = 5.000
F-Number (—) = 1.500

TABLE 4A-continued

Focal Length (mm) = 100.000
Wavelengths [μm] = 9.000 8.000 12.000

Image Point Data

| Wavelength (μm) | FOB | Airy Diameter (μm) | Piercing Points Diameter 95% (μm) | Optical Rath Difference 95% (μm) | Strehl-Def. Ratio |
|---|---|---|---|---|---|
| 9.000 | — | 33.233 | 16.754 | 0.604 | 0.957 |
| 8.000 | — | 29.532 | 10.379 | 0.129 | 0.997 |
| 12.000 | — | 44.321 | 8.568 | 0.201 | 0.997 |
| Polychr | — | 35.080 | 13.114 | 0.384 | 0.977 |
| 9.000 | 0.700 | 33.260 | 22.380 | 0.665 | 0.948 |
| 8.000 | 0.700 | 29.555 | 20.141 | 0.520 | 0.959 |
| 12.000 | 0.700 | 44.358 | 18.886 | 0.482 | 0.984 |
| Polychr | 0.700 | 35.108 | 20.947 | 0.583 | 0.960 |
| 9.000 | 1.000 | 33.253 | 23.685 | 0.782 | 0.928 |
| 8.000 | 1.000 | 29.549 | 38.726 | 1.296 | 0.772 |
| 12.000 | 1.000 | 44.350 | 31.811 | 1.088 | 0.922 |
| polychr | 1.000 | 35.102 | 29.477 | 0.987 | 0.887 |

Figure 14:
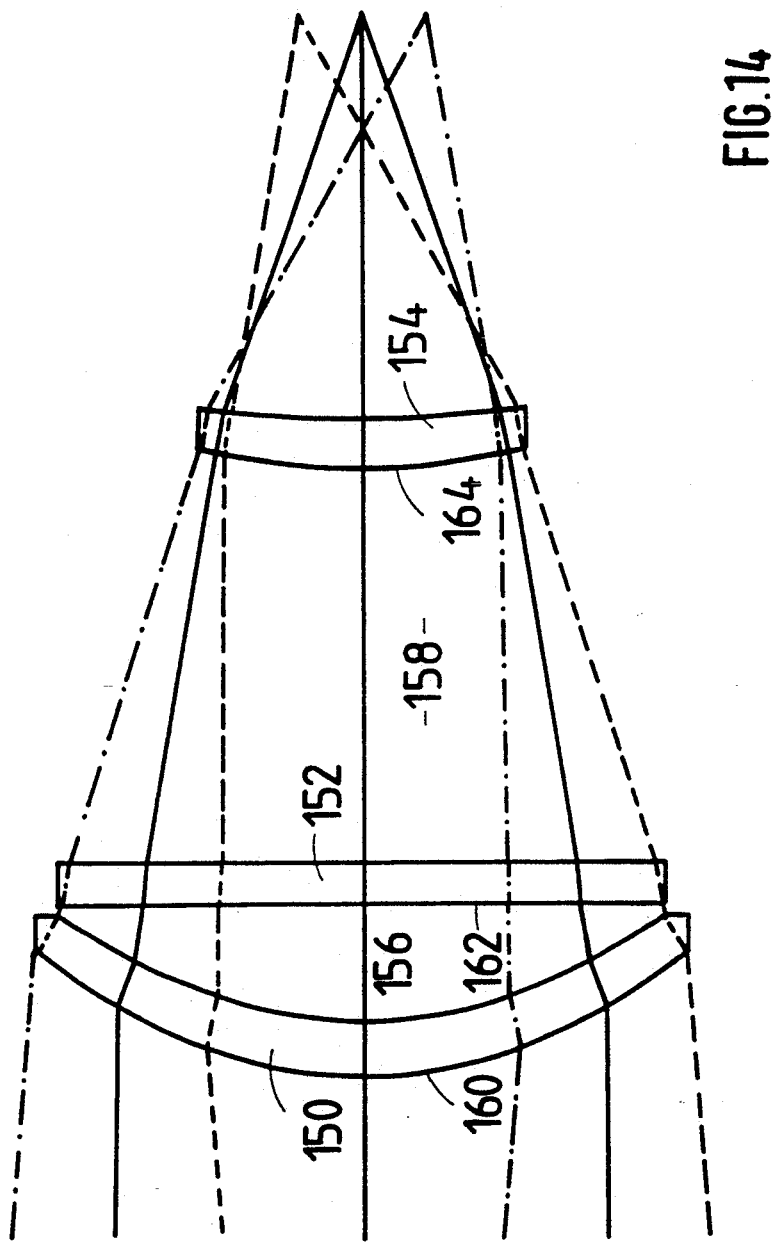
FIG. 14 shows a three-lens objective, which is composed of germanium and zinc sulfide lenses and, therefore, is appropriate for long-wavelength infrared, and wherein the aperture stop is positioned behind the rear lens.

FIG. 14 shows a three-lens objective having a front lens 150, a median lens 152 and a rear lens 154. The front lens 150 consists of germanium, the median lens 152 consists of zinc sulfide, and the rear lens 154 consists of germanium again. The front lens 150 has positive power, the median lens 152 has negative power, and the rear lens 154 has positive power again. An air space 156 is defined between the front lens 150 and the median lens 152. An air space 158 is defined between the median lens 152 and the rear lens 154. The distance of the median lens 152 from the front lens 150 is substantially smaller than the distance of the rear lens 154 from the median lens 152. The front surface 160 of the front lens 152, the front surface 162 of the median lens 152 and the front surface 164 of the rear lens 154 are aspherical.

Also the three-lens objective of FIG. 14 is appropriate for long-wavelength infrared in a wavelength range between 8 μm and 12 μm. Also here, the path of rays is such that an aperture stop can be arranged behind the rear lens 154.

In detail, the data of the three-lens objective of FIG. 14 are as follows:

TABLE 5

Lens Data

| Srf | Radius | Thickness | Aperture Radius | Glass | Notes |
|---|---|---|---|---|---|
| 1 | — | −139.39410 | 33.08307 | Air | |
| 2 | 66.70624 | 7.47378 | 44.00000 | Ge | 1. Lens |
| 3 | 68.69355 | 15.00000 | 41.00000 | Air | |
| 4 | −2421.54311 | 5.63812 | 41.00000 | ZnS | 2. Lens |
| 5 | −4863.26768 | 52.44758 | 40.00000 | Air | |
| 6 | 101.51108 | 6.55595 | 22.00000 | Ge | 3. Lens |
| 7 | 137.03175 | 54.38703 | 18.69937A | Air | |
| 8 | — | — | 8.75690 | Air | Focal Plane |

Special and Aspheric Data

| 2 | CC | −0.06888 |
|---|---|---|
| 4 | CC | −489.14951 |
| 6 | CC | −0.78014 |

Refractive Indices

| Srf | Glass | N1 | N2 | N3 | V |
|---|---|---|---|---|---|
| 1 | Air | — | — | — | — |
| 2 | Ge | 4.00420 | 4.00560 | 4.00190 | 811.81345 |
| 3 | Air | — | — | — | — |
| 4 | ZnS | 2.21230 | 2.22280 | 2.17000 | 22.96014 |
| 5 | Air | — | — | — | — |
| 6 | Ge | 4.00420 | 4.00560 | 4.00190 | 811.81345 |

A three-lens objective having the above recited data exhibits the following characteristics:

TABLE 5A

Optical System Data

| Field of View Angle | (+/− Degree) | = 5.000 | | |
|---|---|---|---|---|
| F-Number | (—) | = 1.511 | | |
| Focal Length | (mm) | = 100.000 | | |
| Wavelengths | [μm] | = 9.000 | 8.000 | 12.000 |

Image Point Data

| Wavelength (μm) | Airy FOB | Diameter (μm) | Piercing Points Diameter 95% (μm) | Optical Path Difference 95% (μm) | Strehl-Def. Ratio |
|---|---|---|---|---|---|
| 9.000 | — | 33.506 | 18.321 | 0.596 | 0.958 |
| 8.000 | — | 29.774 | 3.332 | 0.102 | 0.998 |
| 12.000 | — | 44.690 | 5.459 | 0.181 | 0.998 |
| Polychr | — | 35.369 | 11.358 | 0.369 | 0.978 |
| 9.000 | 0.700 | 33.580 | 17.885 | 0.536 | 0.966 |
| 8.000 | 0.700 | 29.839 | 21.443 | 0.653 | 0.936 |
| 12.000 | 0.700 | 44.791 | 17.572 | 0.516 | 0.982 |
| Polychr | 0.700 | 35.448 | 18.696 | 0.561 | 0.962 |
| 9.000 | 1.000 | 33.623 | 34.295 | 1.126 | 0.857 |
| 8.000 | 1.000 | 29.877 | 49.122 | 1.614 | 0.669 |
| 12.000 | 1.000 | 44.849 | 46.047 | 1.470 | 0.862 |
| Polychr | 1.000 | 35.493 | 44.940 | 1.334 | 0.811 |

Figure 15:
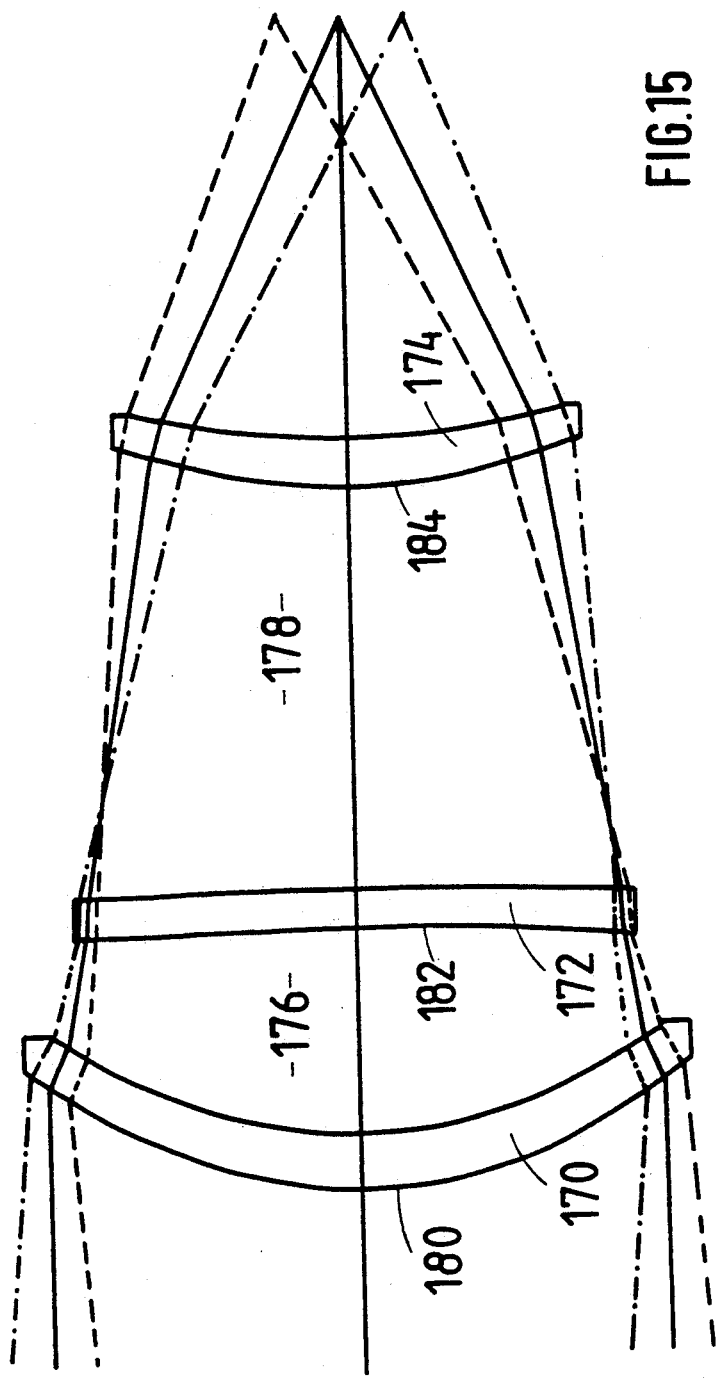
FIG. 15 shows a three-lens objective, which is composed of germanium and zinc selenide lenses and, therefore, is appropriate for long-wavelength infrared, and wherein the aperture stop is to be arranged between the median and rear lenses, this three-lens objective permitting a small f-number to be achieved.

The three-lens objective of FIG. 15 consists of a front lens 170 of germanium, a median lens 172 of zinc selenide, and a rear lens 174 of germanium again. The front lens 170 has positive power, the median lens 172 has negative power, and the rear lens 174 has positive power again. An air space 176 is defined between the front lens 170 and the median lens 172. An air space 178 is defined between the median lens 172 and the rear lens 174. The distance of the median lens 172 from the front lens 170 is substantially smaller than the distance of the rear lens 174 from the median lens 172. The front surface 180 of the front lens 172, the front surface 182 of the median lens 172 and the front surface 184 of the rear lens 174 are aspherical.

Also the three-lens objective of FIG. 15 is appropriate for long-wavelength infrared in a wavelength range between 8 μm and 12 μm. In contrast, for example, to the three-lens objective of FIG. 14, however, the path of rays is such that an aperture stop can be arranged behind the median lens 172 but in front of the rear lens 174.

In detail, the data of the three-lens objective of FIG. 15 are as follows:

TABLE 6

Lens Data

| Srf | Radius | Thickness | Aperture Radius | Glass | Notes |
|---|---|---|---|---|---|
| 1 | — | −42.32215 | 41.66667 | Air | |
| 2 | 69.08962 | 7.47307 | 45.50000 | Ge | 1. Lens |
| 3 | 70.49711 | 27.00000 | 41.52428 | Air | |
| 4 | −467.15591 | 5.63758 | 38.00000 | ZnSe | 2. Lens |
| 5 | −703.91399 | 52.44256 | 33.23295 A | Air | |
| 6 | 80.92787 | 6.55532 | 31.33321 | Ge | 3. Lens |
| 7 | 105.26772 | 6.74923 | 29.36670 | Air | |
| 8 | — | 50.38182 | 22.27019 | Air | |
| 9 | — | — | 10.98252 | Air | Focal Plane |

Special and Aspheric Data

| 2 | CC | −0.08201 |
|---|---|---|
| 4 | CC | −52.88740 |
| 6 | CC | −0.32580 |

Refractive Indices

| Srf | Glass | N1 | N2 | N3 | V |
|---|---|---|---|---|---|
| 1 | Air | — | — | — | — |
| 2 | Ge | 4.00420 | 4.00560 | 4.00190 | 811.81345 |
| 3 | Air | — | — | — | — |
| 4 | ZnSe | 2.41220 | 2.41726 | 2.39296 | 58.12443 |
| 5 | Air | — | — | — | — |
| 6 | Ge | 4.00420 | 4.00560 | 4.00190 | 811.81345 |
| 7 | Air | — | — | — | — |
| 8 | Air | — | — | — | — |
| 9 | Air | — | — | — | — |

A three-lens objective having the above recited data exhibits the following characteristics:

TABLE 6A

Optical System Data

| Field of View Angle | (+/− Degree) | = 5.000 | | |
|---|---|---|---|---|
| F-Number | (—) | = 1.200 | | |
| Focal Lenght | (mm) | = 100.000 | | |
| Wavelengths | [μm] | = 9.000 | 8.000 | 12.000 |

Image Point Data

| Wavelength (μm) | FOB | Airy Diameter (μm) | Piercing Points Diameter 95% (μm) | Optical Path Difference 95% (μm) | Strehl-Def. Ratio |
|---|---|---|---|---|---|
| 9.000 | — | 26.615 | 65.173 | 1.194 | 0.841 |
| 8.000 | — | 23.651 | 47.256 | 0.897 | 0.883 |
| 12.000 | — | 35.497 | 58.274 | 1.031 | 0.930 |
| Polychr | — | 28.094 | 58.969 | 1.079 | 0.874 |
| 9.000 | 0.700 | 26.587 | 35.342 | 0.924 | 0.901 |
| 8.000 | 0.700 | 23.626 | 31.538 | 1.172 | 0.809 |
| 12.000 | 0.700 | 35.461 | 34.200 | 1.133 | 0.916 |
| Polychr | 0.700 | 28.065 | 34.106 | 1.038 | 0.882 |
| 9.000 | 1.000 | 26.580 | 53.625 | 1.935 | 0.634 |
| 8.000 | 1.000 | 23.619 | 65.091 | 2.250 | 0.458 |
| 12.000 | 1.000 | 35.451 | 59.131 | 2.166 | 0.725 |
| Polychr | 1.000 | 28.057 | 57.868 | 2.072 | 0.613 |

Figure 16C:
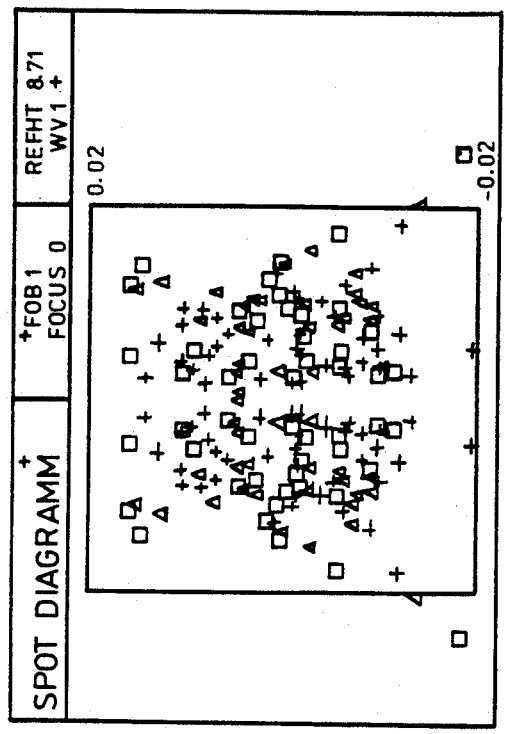
FIG. 16 is similar to FIG. 4 and illustrates, for the various fractional object heights the piercing points of various parallelly incident rays through the focal plane of the three-lens objective illustrated in FIG. 15.
Figure 16B:
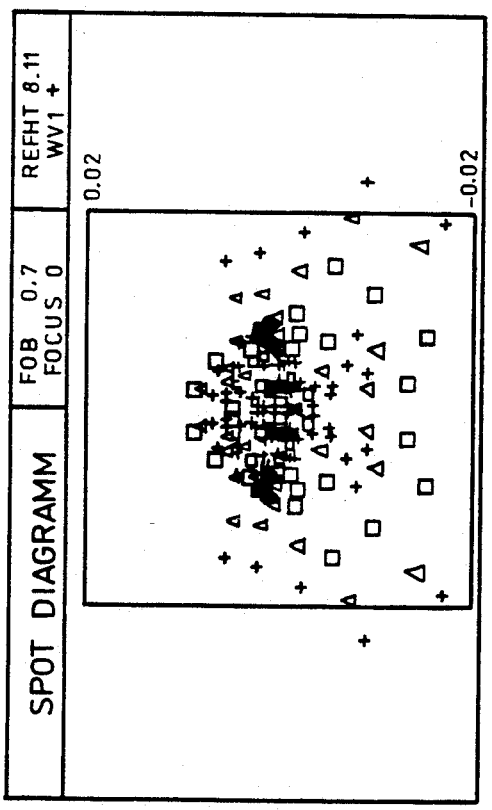
Figure 16A:
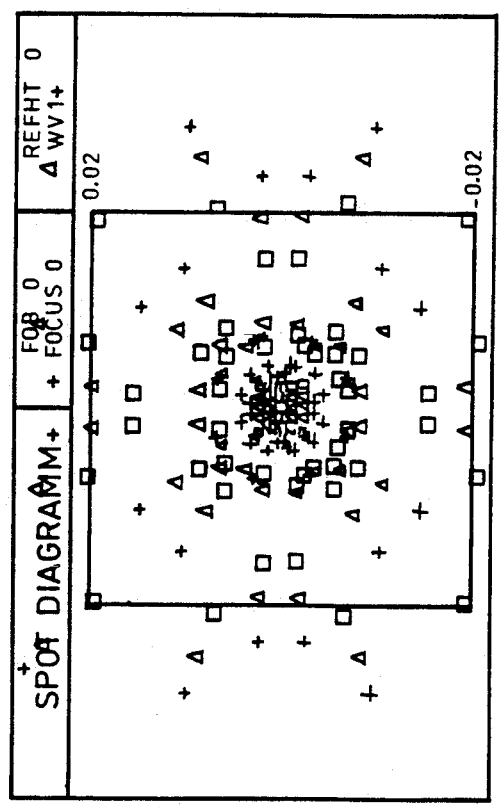

FIG. 16 is, again, a diagram similar to FIG. 4 and illustrates for a number of fractional object heights FOB=0; FOB=0.7 and FOB=1 the piercing points of the various parallelly incident rays through the focal plane in a three-lens objective of FIG. 15.

Figure 17:
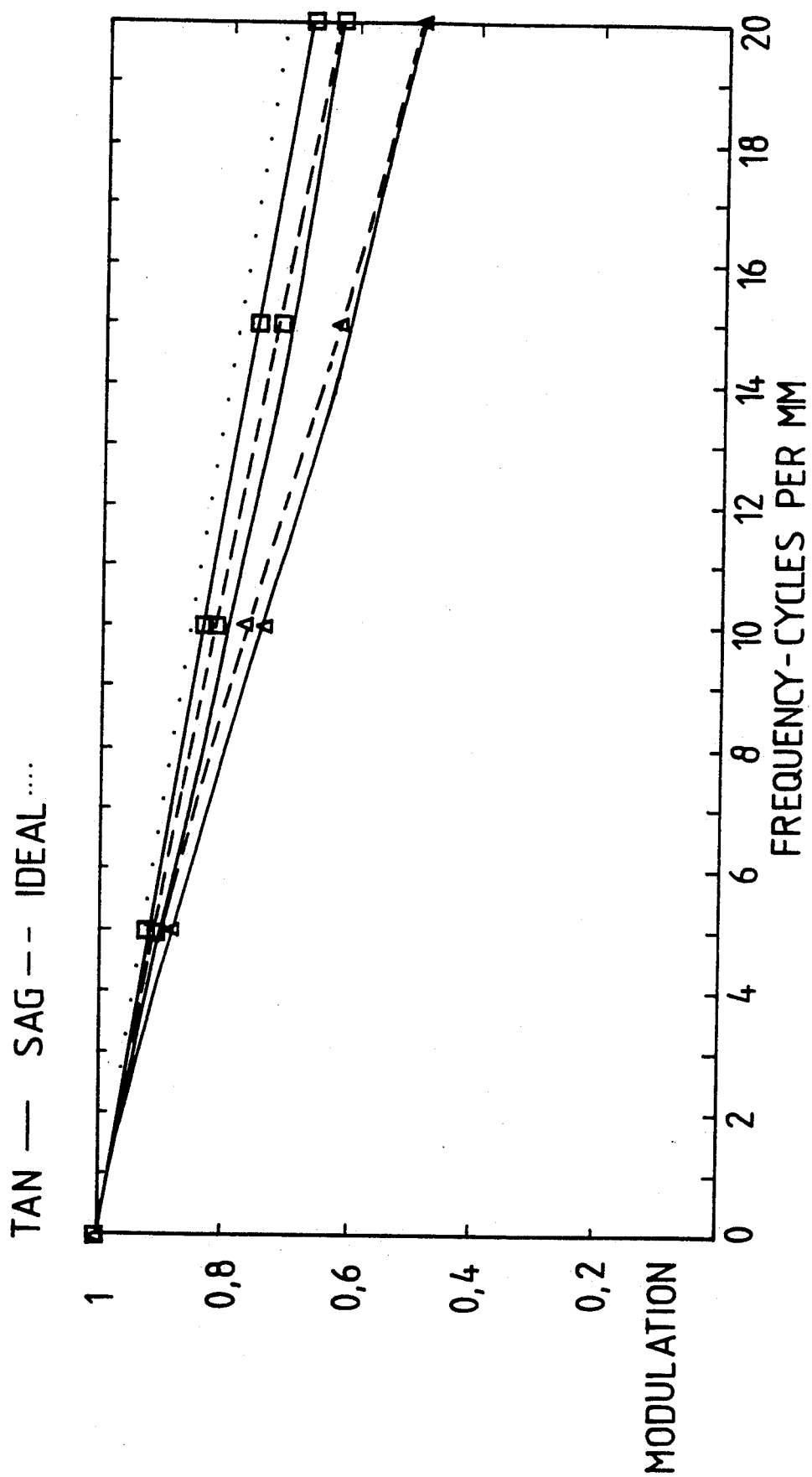
FIG. 17 is similar to FIG. 5 and shows the modulation transfer function for tangential and sagittal rays obtained with the three-lens objective of FIG. 15.

FIG. 17 is a diagram similar to FIGS. 5 and 12 and illustrates 0 three different fractional object heights 0; 0.7 and 1 the for modulation transfer function for tangential and sagittal rays in a three-lens objective of FIG. 15. The graphs pertaining to the fractional object height F=0 are marked by a cross (+), the graphs pertaining to FOB=0.7, are marked by a square, and the graphs pertaining to FOB=1 are marked by a triangle. The graphs for tangential rays are drawn with solid lines. The graphs for sagittal rays are drawn with dashed lines. The ideal graphs are drawn with dotted lines.

Figure 18:
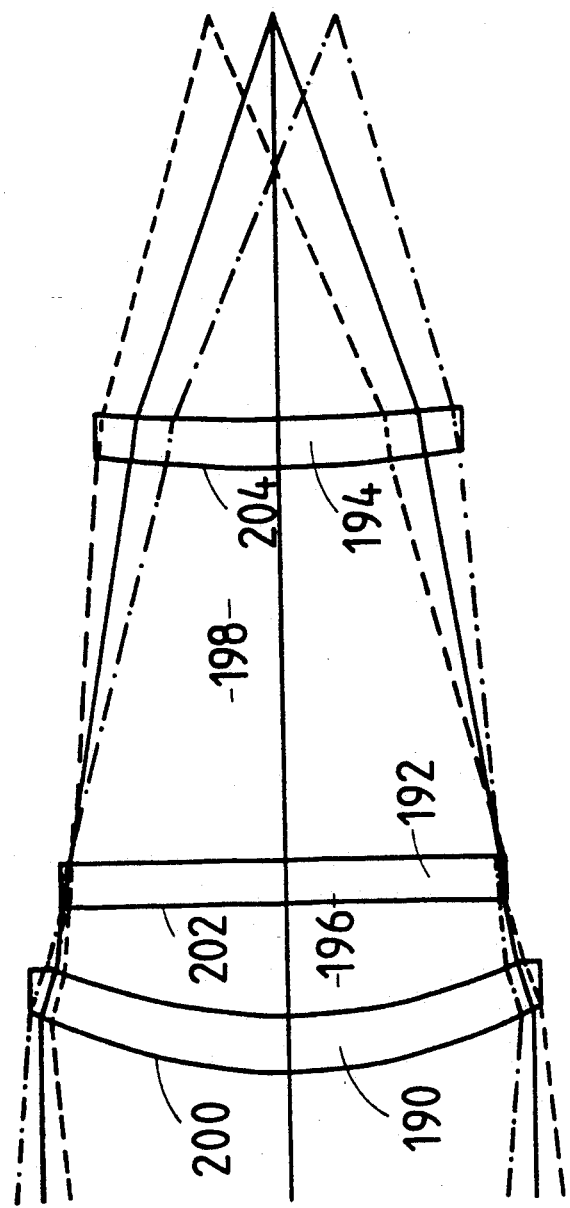
FIG. 18 shows a further embodiment of a three-lens objective, which is composed of germanium and zinc sulfide lenses, an aperture having to be arranged, in this three-lens objective, closely behind the median lens.

The three-lens objective of FIG. 18 consists of a front lens 190 of germanium, a median lens 192 of zinc sulfide, and a rear lens 194 of germanium again. The front lens 190 has positive power, the median lens 192 has negative power, and the rear lens 194 has positive power again. An air space 196 is defined between the front lens 190 and the median lens 192. An air space 198 is defined between the median lens 192 and the rear lens 194. The distance of the median lens 192 from the front lens 190 is substantially smaller than the distance of the rear lens 194 from the median lens 192. The front surface 200 of the front lens 192, the front surface 202 of the median lens 192 and the front surface 204 of the rear lens 194 are aspherical.

In detail, the data of the three-lens objective are as follows:

TABLE 7

Lens Data

| Srf | Radius | Thickness | Aperture Radius | Glass | Notes |
|---|---|---|---|---|---|
| 1 | — | −24.76890 | 33.33333 | Air | |
| 2 | 75.26509 | 7.47306 | 34.33407 | Ge | 1. Lens |
| 3 | 80.17272 | 15.00457V | 32.03975 | Air | |
| 4 | 7827.23829 | 5.63758 | 29.96496 | ZnS | 2. Lens |
| 5 | 2903.51135 | 52.44256 | 29.29838A | Air | |
| 6 | 152.32088 | 6.55532 | 24.63244 | Ge | 3. Lens |
| 7 | 260.72381 | 54.38182 | 23.76313 | Air | |
| 8 | — | — | 8.40445 | Air | Focal Plane |

Special and Aspheric Data

| 2 | CC | −0.08439 |
|---|---|---|
| 4 | CC | −1.8823E + 04 |
| 6 | CC | −2.47048 |

Refractive Indices

| Srf | Glass | RN1/RN4 | RN2/RN5 | RN3/RN6 | VNBR |
|---|---|---|---|---|---|
| 1 | Air | — | — | — | — |
| 2 | Ge | 4.00420 | 4.00560 | 4.00190 | 811.81345 |
| 3 | Air | — | — | — | — |
| 4 | ZnS | 2.21230 | 2.22280 | 2.17000 | 22.96014 |
| 5 | Air | — | — | — | — |
| 6 | Ge | 4.00420 | 4.00560 | 4.00190 | 811.81345 |
| 7 | Air | — | — | — | — |
| 8 | Air | — | — | — | — |

A three-lens objective having the above recited data exhibits the following characteristics:

TABLE 7A

Optical System Data

| Field of View Angle | (+/− Degree) | = 5.000 | | |
|---|---|---|---|---|
| F-Number | (—) | = 1.500 | | |
| Focal Lenght | (mm) | = 100.000 | | |
| Wavelengths | [μm] | = 9.000 | 8.000 | 12.000 |

Image Point Data

| Wavelength (μm) | FOB | AIRY Diameter (μm) | Piercing Points Diameter 95% (μm) | Optical Path Difference 95% (μm) | Strehl Def. Ratio |
|---|---|---|---|---|---|
| 9.000 | — | 33.297 | 47.830 | 0.839 | 0.918 |
| 8.000 | — | 29.590 | 34.826 | 0.478 | 0.965 |
| 12.000 | — | 44.408 | 29.271 | 0.405 | 0.989 |
| Polychr | — | 35.148 | 39.939 | 0.641 | 0.947 |
| 9.000 | 0.700 | 33.348 | 21.025 | 0.673 | 0.946 |
| 8.000 | 0.700 | 29.634 | 18.465 | 0.777 | 0.911 |
| 12.000 | 0.700 | 44.475 | 18.705 | 0.794 | 0.958 |
| Polychr | 0.700 | 35.201 | 19.805 | 0.729 | 0.940 |
| 9.000 | 1.000 | 33.412 | 35.305 | 1.384 | 0.792 |
| 8.000 | 1.000 | 29.691 | 45.260 | 1.610 | 0.670 |
| 12.000 | 1.000 | 44.560 | 49.096 | 1.645 | 0.831 |
| Polychr | 1.000 | 35.269 | 41.242 | 1.506 | 0.771 |

The various embodiments have in common, that the two positive power lenses have a bending towards the longer one of the back or front focal lengths, respectively.

Furthermore, it has been found, that the aspherical surfaces can be pure conic section surfaces of revolution, thus ellipsoids of revolution, hyperboloids of revolution or paraboloids of revolution.

I claim:

1. A three-lens objective comprising three lenses and having a relatively short and a relatively long back or front focal length, respectively, each of said lenses having a front surface facing an object and a rear surface facing an image of said object, wherein a front one of said lenses consists of a first material of relatively low dispersion, a median one of said lenses consists of a second material of relatively larger dispersion, and a rear one of said lenses consists of a material of relatively low dispersion, said front lens has positive power, said median lens has negative power, and said rear lens has positive power, the spacing between said front lens and said median lens is substantially smaller than the distance between said median lens and said rear lens, and each of said lenses has at least one aspherical surface.

2. A three-lens objective as claimed in claim 1, wherein each of said lenses has one aspherical surface and one spherical surface.

3. A three-lens objective as claimed in claim 2, wherein each lens has an aspherical front surface and a spherical rear surface.

4. A three-lens objective as claimed in claim 3, wherein the conic constant of said aspherical surface of said front lens is smaller than −0.01, the conic constant of said aspherical surface of said median lens is smaller than −5, and the conic constant of said aspherical surface of said rear lens is smaller than −0.1.

5. A three-lens objective as claimed in claim 1, wherein said aspherical surfaces are pure conic section surfaces of revolution.

6. A three-lens objective as claimed in claim 1, wherein the two positive power lenses have a bending towards the longer one of the back or front focal lengths, respectively.

7. A three-lens objective as claimed in claim 1, wherein the materials of said front lens and of said rear lens are identical.

8. A three-lens objective as claimed in claim 7 for use in the infrared spectral range between the wavelengths of 3 μm and 5.5 μm, wherein said front lens and said rear lens consist of silicon and the median lens consists of germanium.

9. A three-lens objective as claimed in claim 7 for use in the infrared spectral range between the wavelengths of 8μ and 12μ, wherein said front lens and said rear lens consist of germanium and said median lens consists of zinc selenide.

10. A three-lens objective as claimed in claim 7, for use in the infrared spectral range between the wavelengths of 8μ and 12μ, wherein said front lens and said rear lens consist of germanium and said median lens consists of zinc sulfide.

11. A three-lens objective as claimed in claim 1, wherein the smallest cross sectional area of all imaging light beams is located behind the rear lens, whereby an aperture stop is placed at this location behind the rear lens without causing vignetting.

12. A three-lens objective as claimed in claim 1 and having the following data:

TABLE 1

Lens Data

| Surface | Radius | Thickness | Aperture Radius | Material |
|---|---|---|---|---|
| 1 | — | — | 25.576769 | Air |
| 2 | 95.775000 | 5.700000 | 25.576769A | Si |
| 3 | 362.560000 | 9.800000 | 25.039522 | Air |
| 4 | −115.480000 | 4.300000 | 21.96955 | Ge |
| 5 | −296.400000 | 40.000000 | 22.070983 | Air |
| 6 | 39.525000 | 5.000000 | 15.410790 | Si |
| 7 | 40.973000 | 41.479150 | 13.972384 | Air |
| 8 | — | — | 4.519556 | Air |

TABLE 1-continued

Aspheric Surface Data

| | | | | | |
|---|---|---|---|---|---|
| 2 | CC | −1.260288 | AD −2.10940E−08 | AE | −4.82038E−11 |
| 4 | CC | −12.095072 | AD 2.05607E−07 | AE | −3.62017E−11 |
| 6 | CC | −0.984138 | AD 8.95639E−07 | AE | −2.08363E−11 |

Refractive Indices

| Surface | Material | n1 | n2 | n3 | Abbe-Dispersion Number V |
|---|---|---|---|---|---|
| 1 | Air | — | — | — | — |
| 2 | Si | 3.424332 | 3.429186 | 3.421818 | 329.041382 |
| 3 | Air | — | — | — | — |
| 4 | Ge | 4.021400 | 4.034114 | 4.014581 | 154.677323 |
| 5 | Air | — | — | — | — |
| 6 | Si | 3.424332 | 3.429186 | 3.421818 | 329.041382 |
| 7 | Air | — | — | — | — |
| 8 | Air | — | — | — | — |

13. A three-lens objective as claimed in claim 1 and having the following data:

TABLE 2

Lens Data

| Srf | Radius | Thickness | Aperture Radius | Material |
|---|---|---|---|---|
| 1 | — | −13.003369 | 13.847083 | Air |
| 2 | 40.973000 | 4.000000 | 15.493000 | Si |
| 3 | 139.240000 | 6.450000 | 14.923000 | Air |
| 4 | −34.974000 | 2.000000 | 10.586000 | Ge |
| 5 | −102.180000 | — | 10.609000 | Air |
| 6 | — | — | 10.444000 | |
| 7 | — | 13.300000 | 10.444000 | Air |
| 8 | 23.544000 | 3.000000 | 10.324000 | Si1 |
| 9 | 35.481000 | 3.500000 | 9.695000 | Air |
| 10 | — | 3.000000 | 8.999000 | Si Scanner |
| 11 | — | 2.197175V | 8.728000 | Air |
| 12 | — | 2.000000 | 8.005000 | Ge Window |
| 13 | — | 2.000000 | 7.851000 | Air |
| 14 | — | — | 7.204000 | |
| 15 | — | 6.000000 | 7.204000 | Air |
| 16 | — | — | 5.263000 | |
| 17 | — | — | 5.263000 | Air |
| 18 | — | 1.000000 | 5.263000 | Si |
| 19 | — | 2.000000 | 5.173000 | Air |
| 20 | — | — | 4.526000 | Air |

Aspheric Surface Data

| | | | | | |
|---|---|---|---|---|---|
| 2 | CC | −0.974975 | AD −3.32409E−07 | AE | 2.23708E−11 |
| 4 | CC | −10.283235 | AD −7.33080E−07 | AE | 2.38799E−09 |
| 8 | CC | −0.989312 | AD −3.82908E−06 | AE | 6.37996E−10 |

Refractive Indices

| Srf | Material | N1 | N2 | N3 | Abbe-Dispersion Number V |
|---|---|---|---|---|---|
| 1 | Air | — | — | — | — |
| 2 | Si | 3.423380 | 3.426478 | 3.421153 | 455.143820 |
| 3 | Air | — | — | — | — |
| 4 | Ge | 4.018807 | 4.027057 | 4.012839 | 212.321165 |
| 5 | Air | — | — | — | — |
| 6 | | 1.000000 | 1.000000 | 1.000000 | — |
| 7 | Air | — | — | — | — |
| 8 | Si | 3.423380 | 3.426478 | 3.421153 | 455.143820 |
| 9 | Air | — | — | — | — |
| 10 | Si | 3.423380 | 3.426478 | 3.421153 | 455.143820 |
| 11 | Air | — | — | — | — |
| 12 | Ge | 4.018807 | 4.027057 | 4.012839 | 212.321165 |
| 13 | Air | — | — | — | — |
| 14 | | 1.000000 | 1.000000 | 1.000000 | — |
| 15 | Air | — | — | — | — |
| 16 | | 1.000000 | 1.000000 | 1.000000 | — |
| 17 | Air | — | — | — | — |
| 18 | Si | 3.423380 | 3.426478 | 3.421153 | 455.143820 |
| 19 | Air | — | — | — | — |
| 20 | Air | — | — | — | — |

14. A three-lens objective as claimed in claim 1 and having the following data:

TABLE 3

Lens Data

| Srf | Radius | Thickness | Aperture Radius | Glass | Notes |
|---|---|---|---|---|---|
| 1 | — | −177.23730 | 41.66667 | Air | |
| 2 | 70.01694 | 7.47307 | 55.00000 | Ge | 1. Lens |
| 3 | 71.50233 | 27.00000 | 52.43139 S | Air | |
| 4 | −517.42425 | 5.63758 | 52.00000 | ZnSe | 2. Lens |
| 5 | −743.63318 | 52.44256 | 52.00000 | Air | |
| 6 | 85.02567 | 6.55532 | 32.00000 | Ge | 3. Lens |
| 7 | 112.74740 | 6.74923 | 31.00000 | Air | |
| 8 | — | 50.38182 | 22.27019A | Air | |
| 9 | — | — | 10.98252 | Air | Focal Plane |

Special and Aspheric Data

| | | |
|---|---|---|
| 2 | CC | −0.06772 |
| 4 | CC | −16.82474 |
| 6 | CC | −0.28703 |

Refractive Indices

| Srf | Glass | N1 | N2 | N3 | V |
|---|---|---|---|---|---|
| 1 | Air | — | — | — | — |
| 2 | Ge | 4.00420 | 4.00560 | 4.00190 | 811.81345 |
| 3 | Air | — | — | — | — |
| 4 | ZnSe | 2.41220 | 2.41726 | 2.39296 | 58.12443 |
| 5 | Air | — | — | — | — |
| 6 | Ge | 4.00420 | 4.00560 | 4.00190 | 811.81345 |
| 7 | Air | — | — | — | — |
| 8 | Air | — | — | — | — |
| 9 | Air | — | — | — | — |

15. A three-lens objective as claimed in claim 1 and having the following data:

TABLE 4

Lens Data

| Srf | Radius | Thickness | Aperture Radius | Glass | Notes |
|---|---|---|---|---|---|
| 1 | — | −156.29093 | 33.33333 | Air | |
| 2 | 64.24548 | 7.47307 | 45.50000 | Ge | 1. Lens |
| 3 | 65.75754 | 17.00000 | 42.74139 | Air | |
| 4 | −670.00482 | 5.63758 | 42.50000 | ZnSe | 2. Lens |
| 5 | −1105.21495 | 52.44256 | 42.50000 | Air | |
| 6 | 74.24877 | 6.55532 | 23.50000 | Ge | 3. Lens |
| 7 | 89.57195 | 4.00000 | 22.00000 | Air | |
| 8 | — | 50.38182 | 17.81615A | Air | |
| 9 | — | — | 8.78602 | Air | Focal Plane |

Special and Aspheric Data

| | | |
|---|---|---|
| 2 | CC | −0.06463 |
| 4 | CC | −91.21630 |
| 6 | CC | −0.37256 |

Refractive Indices

| Srf | Glass | N1 | N2 | N3 | V |
|---|---|---|---|---|---|
| 1 | Air | — | — | — | — |
| 2 | Ge | 4.00420 | .4.00560 | 4.00190 | 811.81345 |
| 3 | Air | — | — | — | — |
| 4 | ZnSe | 2.41220 | 2.41726 | 2.39296 | 58.12443 |
| 5 | Air | — | — | — | — |
| 6 | Ge | 4.00420 | 4.00560 | 4.00190 | 811.81345 |
| 7 | Air | — | — | — | — |
| 8 | Air | — | — | — | — |
| 9 | Air | — | — | — | — |

16. A three-lens objective as claimed in claim 1 and having the following data:

TABLE 2-continued

| | | | | | |
|---|---|---|---|---|---|
| 19 | Air | — | — | — | — |
| 20 | Air | — | — | — | — |

TABLE 5

Lens Data

| Srf | Radius | Thickness | Aperture Radius | Glass | Notes |
|---|---|---|---|---|---|
| 1 | — | −139.39410 | 33.08307 | Air | |
| 2 | 66.70624 | 7.47378 | 44.00000 | Ge | 1. Lens |
| 3 | 68.69355 | 15.00000 | 41.00000 | Air | |
| 4 | −2421.54311 | 5.63812 | 41.00000 | ZnS | 2. Lens |
| 5 | −4863.26768 | 52.44758 | 40.00000 | Air | |
| 6 | 101.51108 | 6.55595 | 22.00000 | Ge | 3. Lens |
| 7 | 137.03175 | 54.38703 | 18.69937A | Air | |
| 8 | — | — | 8.75690 | Air | Focal Plane |

Special and Aspheric Data

| | | |
|---|---|---|
| 2 | CC | −0.06888 |
| 4 | CC | −489.14951 |
| 6 | CC | −0.78014 |

Refractive Indices

| Srf | Glass | N1 | N2 | N3 | V |
|---|---|---|---|---|---|
| 1 | Air | — | — | — | — |
| 2 | Ge | 4.00420 | 4.00560 | 4.00190 | 811.81345 |
| 3 | Air | — | — | — | — |
| 4 | ZnS | 2.21230 | 2.22280 | 2.17000 | 22.96014 |
| 5 | Air | — | — | — | — |
| 6 | Ge | 4.00420 | 4.00560 | 4.00190 | 811.81345 |

17. A three-lens objective as claimed in claim 1 and having the following data:

TABLE 6

Lens Data

| Srf | Radius | Thickness | Aperture Radius | Glass | Notes |
|---|---|---|---|---|---|
| 1 | — | −42.32215 | 41.66667 | Air | |
| 2 | 69.08962 | 7.47307 | 45.50000 | Ge | 1. Lens |
| 3 | 70.49711 | 27.00000 | 41.52428 | Air | |
| 4 | −467.15591 | 5.63758 | 38.00000 | ZnSe | 2. Lens |
| 5 | −703.91399 | 52.44256 | 33.23295A | Air | |
| 6 | 80.92787 | 6.55532 | 31.33321 | Ge | 3. Lens |
| 7 | 105.26772 | 6.74923 | 29.36970 | Air | |
| 8 | — | 50.38182 | 22.27019 | Air | |
| 9 | — | — | 10.98252 | Air | Focal Plane |

Special and Aspheric Data

| | | |
|---|---|---|
| 2 | CC | −0.08201 |
| 4 | CC | −52.88740 |
| 6 | CC | −0.32580 |

Refractive Indices

| Srf | Glass | N1 | N2 | N3 | V |
|---|---|---|---|---|---|
| 1 | Air | — | — | — | — |
| 2 | Ge | 4.00420 | 4.00560 | 4.00190 | 811.81345 |
| 3 | Air | — | — | — | — |
| 4 | ZnSe | 2.41220 | 2.41726 | 2.39296 | 58.12443 |
| 5 | Air | — | — | — | — |
| 6 | Ge | 4.00420 | 4.00560 | 4.00190 | 811.81345 |
| 7 | Air | — | — | — | — |
| 8 | Air | — | — | — | — |
| 9 | Air | — | — | — | — |

18. A three-lens objective as claimed in claim 1 and having the following data:

TABLE 7

Lens Data

| Srf | Radius | Thickness | Aperture Radius | Glass | Notes |
|---|---|---|---|---|---|
| 1 | — | −24.76890 | 33.33333 | Air | |
| 2 | 75.26509 | 7.47306 | 34.33407 | Ge | 1. Lens |
| 3 | 80.17272 | 15.00457V | 32.03975 | Air | |
| 4 | 7827.23829 | 5.63758 | 29.96496 | ZnS | 2. Lens |
| 5 | 2903.51135 | 52.44256 | 29.29838A | Air | |
| 6 | 152.32088 | 6.55532 | 24.63244 | Ge | 3. Lens |
| 7 | 260.72381 | 54.38182 | 23.76313 | Air | |
| 8 | — | — | 8.40445 | Air | Focal Plane |

Special and Aspheric Data

| | | |
|---|---|---|
| 2 | CC | −0.08439 |
| 4 | CC | −1.8823E + 04 |
| 6 | CC | −2.47048 |

Refractive Indices

| Srf | Glass | N1 | N2 | N3 | V |
|---|---|---|---|---|---|
| 1 | Air | — | — | — | — |
| 2 | Ge | 4.00420 | 4.00560 | 4.00190 | 811.81345 |
| 3 | Air | — | — | — | — |
| 4 | ZnS | 2.21230 | 2.22280 | 2.17000 | 22.96014 |
| 5 | Air | — | — | — | — |
| 6 | Ge | 4.00420 | 4.00560 | 4.00190 | 811.81345 |
| 7 | Air | — | — | — | — |
| 8 | Air | — | — | — | — |

* * * * *